US012444840B2

(12) United States Patent
Xue et al.

(10) Patent No.: US 12,444,840 B2
(45) Date of Patent: Oct. 14, 2025

(54) ANTENNA AND MOBILE TERMINAL

(71) Applicant: HUAWEI TECHNOLOGIES CO., LTD., Shenzhen (CN)

(72) Inventors: Liang Xue, Shanghai (CN); Hanyang Wang, Reading (GB); Chuanbo Shi, Shanghai (CN); Yiwen Gong, Shanghai (CN); Jikang Wang, Shanghai (CN); Xiaowei Zhang, Shenzhen (CN); Dong Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 18/003,656

(22) PCT Filed: Jun. 30, 2021

(86) PCT No.: PCT/CN2021/103880
§ 371 (c)(1),
(2) Date: Dec. 28, 2022

(87) PCT Pub. No.: WO2022/002172
PCT Pub. Date: Jan. 6, 2022

(65) Prior Publication Data

US 2023/0291102 A1 Sep. 14, 2023

(30) Foreign Application Priority Data

Jun. 30, 2020 (CN) ......................... 202010615049.3

(51) Int. Cl.
*H01Q 5/385* (2015.01)
*H01Q 1/24* (2006.01)
*H01Q 1/48* (2006.01)

(52) U.S. Cl.
CPC ............ *H01Q 5/385* (2015.01); *H01Q 1/243* (2013.01); *H01Q 1/48* (2013.01)

(58) Field of Classification Search
None
See application file for complete search history.

(56) References Cited

U.S. PATENT DOCUMENTS

2009/0015487 A1 1/2009 Chen et al.
2018/0278287 A1 9/2018 Nishikawa et al.
2018/0375973 A1 12/2018 Song et al.
(Continued)

FOREIGN PATENT DOCUMENTS

CN 105870593 A 8/2016
CN 107666036 A 2/2018
(Continued)

*Primary Examiner* — Dameon E Levi
*Assistant Examiner* — Anh N Ho
(74) *Attorney, Agent, or Firm* — Leydig, Voit & Mayer, Ltd.

(57) ABSTRACT

An antenna is provided, which includes: a main stub, a first parasitic stub, and a second parasitic stub. The first parasitic stub and the second parasitic stub are respectively arranged on two sides of the main stub. The first parasitic stub and the second parasitic stub are configured to excite resonances to improve main resonance efficiency or expand bandwidth. A frequency of the resonance excited by the first parasitic stub is greater than a frequency of a resonance excited by the main stub. A frequency of the resonance excited by the second parasitic stub is less than the frequency of the resonance excited by the main stub.

14 Claims, 23 Drawing Sheets

(56) References Cited

U.S. PATENT DOCUMENTS

| | | | | |
|---|---|---|---|---|
| 2019/0044218 | A1* | 2/2019 | Ye | H01Q 5/50 |
| 2019/0348762 | A1* | 11/2019 | Chou | H01Q 5/328 |
| 2021/0126349 | A1* | 4/2021 | Zhou | H01Q 1/36 |

FOREIGN PATENT DOCUMENTS

| | | | | | |
|---|---|---|---|---|---|
| CN | 108713277 | A | | 10/2018 | |
| CN | 108879116 | A | | 11/2018 | |
| CN | 109950701 | A | * | 6/2019 | |
| CN | 111180872 | A | * | 5/2020 | H01Q 1/242 |
| WO | 2012147355 | A1 | | 11/2012 | |
| WO | WO-2015085554 | A1 | * | 6/2015 | H01Q 1/243 |
| WO | WO-2019071848 | A1 | * | 4/2019 | H01Q 1/24 |
| WO | 2019129098 | A1 | | 7/2019 | |

* cited by examiner

ANTENNA AND MOBILE TERMINAL

CROSS-REFERENCE TO RELATED APPLICATIONS

This application is a National Stage of International Application No. PCT/CN2021/103880, filed on Jun. 30, 2021, which claims priority to Chinese Patent Application No. 202010615049.3, filed on Jun. 30, 2020, both of which are hereby incorporated by reference in their entireties.

TECHNICAL FIELD

Embodiments of this application relate to the field of communications technologies, and in particular, to an antenna and a mobile terminal.

BACKGROUND

In mobile phone industry, a full-ceramic (or glass) appearance becomes a main direction of evolution of a mobile phone. This means that an originally-exposed metal frame (an antenna radiator) is inwardly retracted within a screen or battery cover. Decrease in clearance inside the mobile phone causes sharp deterioration in performance of an antenna. In the conventional technology, performance of an antenna is improved by adding a parasitic stub. However, in the conventional technology, the performance of the antenna is improved by using the parasitic stub to a limited extent.

SUMMARY

Embodiments of this application provide an antenna and a mobile terminal, to improve antenna performance.

According to a first aspect, an antenna is provided. The antenna is applied to a mobile terminal, for example, a common mobile terminal such as a mobile phone, a tablet computer, or a notebook computer. The antenna may include the following structures: a main stub, a first parasitic stub, and/or a second parasitic stub. The first parasitic stub and the second parasitic stub are respectively arranged on two sides of the main stub. The first parasitic stub and the second parasitic stub are configured to excite resonances to improve main resonance efficiency or expand bandwidth. During specific connection, the first parasitic stub is coupled to the main stub by electric field coupling, and a frequency of the resonance excited by the first parasitic stub is greater than a frequency of a resonance excited by the main stub. The second parasitic stub is coupled to the main stub by electric field and magnetic field coupling, and a frequency of the resonance excited by the second parasitic stub is less than the frequency of the resonance excited by the main stub. In the foregoing technical solution, the first parasitic stub and the second parasitic stub are coupled to the main stub in an electric field coupling manner or an electric field and magnetic field coupling manner, to excite a resonance to improve antenna efficiency, expand bandwidth, and improve antenna performance.

In a specific implementable solution, the first parasitic stub and the second parasitic stub may be disposed in different manners. For example, the antenna may include both the first parasitic stub and the second parasitic stub. Alternatively, the antenna includes only the first parasitic stub. Alternatively, the antenna includes only the second parasitic stub.

In a specific implementable solution, when the antenna includes only the first parasitic stub or the second parasitic stub, the first parasitic stub or the second parasitic stub included in the antenna is a parasitic stub that can be configured to excite resonances in two different modes. Therefore, different resonances are provided to improve the antenna performance.

In a specific implementable solution, when the antenna includes the first parasitic stub and the second parasitic stub, the first parasitic stub and the second parasitic stub are parasitic stubs that can be configured to excite resonances in different modes. For example, both the first parasitic stub and the second parasitic stub may excite resonances in two different modes. Alternatively, both the first parasitic stub and the second parasitic stub are parasitic stubs that are configured to excite only one resonance. The antenna performance can be improved by different parasitic stubs.

In a specific implementable solution, the first parasitic stub is a parasitic stub configured to excite resonances in two different modes, and the second parasitic stub is a parasitic stub configured to excite resonances in two different modes. Two different resonances are excited by the first parasitic stub and the second parasitic stub, to improve the antenna performance.

In a specific implementable solution, the resonances in the two different modes may include any two of a resonance in a $\frac{1}{4}\lambda$ mode, a resonance in a $\frac{1}{2}\lambda$ mode, a resonance in a $\frac{3}{4}\lambda$ mode, or a resonance in a $\lambda$ mode. $\lambda$ is a wavelength corresponding to an operating frequency of the antenna. The antenna performance is improved by using resonances in different modes.

In a specific implementable solution, the main stub has a first end and a second end. The first parasitic stub is coupled to the first end by electric field coupling, and the second parasitic stub is coupled to the second end by electric field and magnetic field coupling.

A first ground point is disposed on the main stub, and the first ground point is close to the second end.

A second ground point is disposed on the first parasitic stub, and the second ground point is far away from an end that is of the first parasitic stub and that is close to the second end.

A third ground point is disposed on the second parasitic stub, and the third ground point is far away from an end that is of the second parasitic stub and that is close to the first end. The first ground point, the second ground point, and the third ground point are disposed to implement electric field coupling between the first parasitic stub and the main stub, and electric field and magnetic field coupling between the second parasitic stub and the main stub.

In a specific implementable solution, the main stub has a first end and a second end. The first parasitic stub is coupled to the first end by electric field coupling, and the second parasitic stub is coupled to the second end by electric field and magnetic field coupling.

A first ground point is disposed on the main stub, and the first ground point is far away from the second end.

A second ground point is disposed on the first parasitic stub, and the second ground point is far away from an end that is of the first parasitic stub and that is close to the second end.

A third ground point is disposed on the second parasitic stub, and the third ground point is close to an end that is of the second parasitic stub and that is close to the first end. The first ground point, the second ground point, and the third ground point are disposed to implement electric field coupling between the first parasitic stub and the main stub, and electric field and magnetic field coupling between the second parasitic stub and the main stub.

In a specific implementable solution, the second ground point is connected to a high-pass low-cut filter circuit. The first parasitic stub generates a dual-mode resonance by using the filter circuit.

In a specific implementable solution, the main stub has a first end and a second end. The first parasitic stub is coupled to the first end by electric field coupling, and the second parasitic stub is coupled to the second end by electric field and magnetic field coupling.

A first ground point is disposed on the main stub, and the first ground point is far away from the second end.

A second ground point is disposed on the first parasitic stub, and the second ground point is far away from an end that is of the first parasitic stub and that is close to the second end.

A third ground point and a fourth ground point are disposed on the second parasitic stub, the third ground point is close to an end that is of the second parasitic stub and that is close to the first end, and the fourth ground point is close to another end of the second parasitic stub. The first ground point, the second ground point, the third ground point, and the fourth ground point are disposed to implement electric field coupling between the first parasitic stub and the main stub, and electric field and magnetic field coupling between the second parasitic stub and the main stub.

In a specific implementable solution, the second ground point, the third ground point, or the fourth ground point is separately connected to a tunable component or a fixed component. A ground connection is implemented by using the foregoing different components.

In a specific implementable solution, the fixed component may be any one of a fixed resistor, a fixed capacitor, a fixed inductor component, a distributed inductor, a distributed capacitor, and a filter circuit. The tunable component may be one of a switch or a variable capacitor.

In a specific implementable solution, the antenna includes the first parasitic stub and the second parasitic stub. The first parasitic stub is a parasitic stub configured to excite a resonance in a first mode, and the second parasitic stub is a parasitic stub configured to excite a resonance in a second mode. The first mode may be the same as or different from the second mode. In this way, different resonances or a same resonance may be excited by using different parasitic stubs, to improve the antenna performance.

In a specific implementable solution, the resonance in one mode may include any one of a resonance in a $\frac{1}{4}\lambda$ mode, a resonance in a $\frac{1}{2}\lambda$ mode, a resonance in a $\frac{3}{4}\lambda$ mode, or a resonance in a $\lambda$ mode. $\lambda$ is a wavelength corresponding to an operating frequency of the antenna. The antenna performance is improved by using resonances in different modes.

In a specific implementable solution, the main stub has a first end and a second end. The first parasitic stub is coupled to the first end by electric field coupling, and the second parasitic stub is coupled to the second end by electric field and magnetic field coupling.

A first ground point is disposed on the main stub, and the first ground point is far away from the second end.

A second ground point is disposed on the first parasitic stub, and the second ground point is far away from an end that is of the first parasitic stub and that is close to the second end.

A third ground point is disposed on the second parasitic stub, and the third ground point is far away from an end that is of the second parasitic stub and that is close to the first end. The first ground point, the second ground point, and the third ground point are disposed to implement electric field coupling between the first parasitic stub and the main stub, and electric field and magnetic field coupling between the second parasitic stub and the main stub.

According to a second aspect, a mobile terminal is provided. The mobile terminal includes a housing and the antenna according to any one of the foregoing implementable solutions disposed in the housing. In the foregoing technical solution, the first parasitic stub and the second parasitic stub are coupled to the main stub in an electric field coupling manner or an electric field and magnetic field coupling manner, to excite a resonance to improve antenna efficiency, expand bandwidth, and improve antenna performance.

In a specific implementable solution, the first parasitic stub, the main stub, and the second parasitic stub may be disposed at any position of the housing, including but not limited to upper and lower short edges, left and right long edges, four corners combining the long and short edges of the housing, and the like. This facilitates antenna configuration.

In a specific implementable solution, an implementation of the antenna includes but is not limited to making the main stub, the first parasitic stub, and the second parasitic stub from a metal frame, an embedded metal, a laser forming structure, a flexible circuit board, or another metal material in the housing. The main stub, the first parasitic stub, and the second parasitic stub are made in different manners.

DESCRIPTION OF EMBODIMENTS

The following further describes embodiments of this application in detail with reference to the accompanying drawings.

Figure 1:
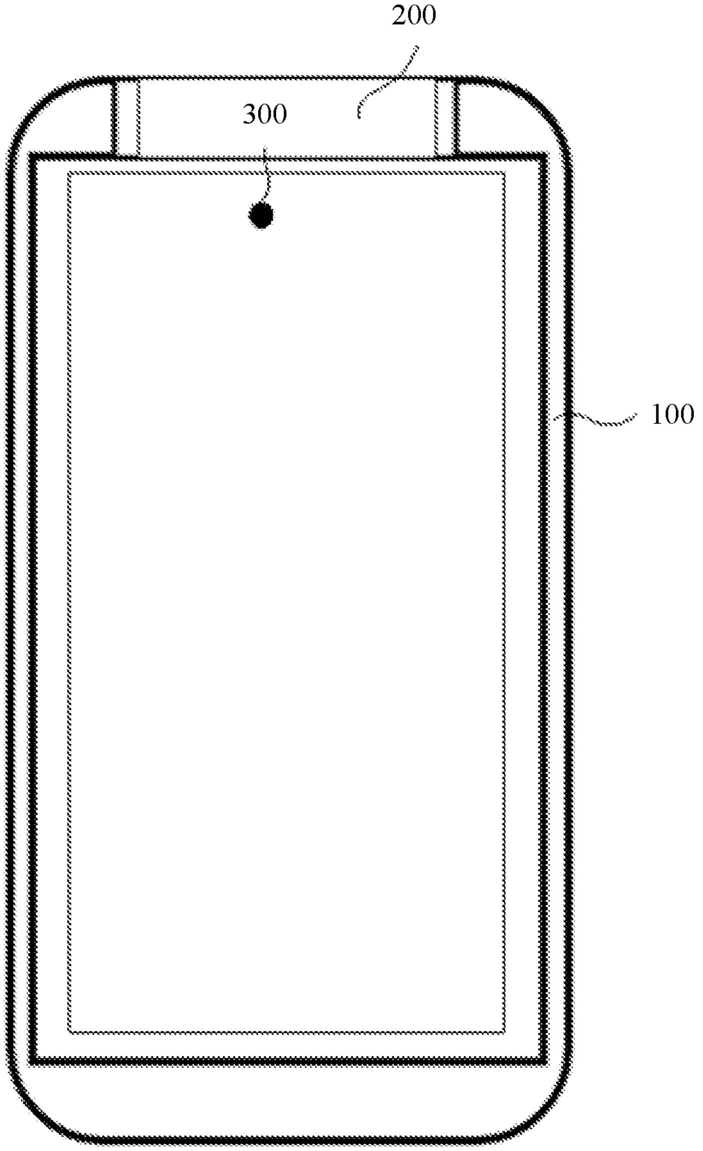
FIG. 1 is a schematic diagram of an application scenario of an antenna according to an embodiment of this application.

For ease of understanding an antenna provided in embodiments of this application, an application scenario of the antenna is first described. The antenna provided in embodiments of this application may be applied to a mobile terminal, including but not limited to common portable communication devices such as a mobile phone, a tablet computer, and an intelligent wearable device (for example, a band or an electronic watch). For example, FIG. 1 shows a structure in which an antenna is applied to a mobile phone. The mobile phone includes a housing 100 and a mainboard 300 disposed in the housing 100, and further includes an antenna 200 disposed in the housing 100. The antenna 200 is electrically connected to the mainboard 300, and is fed through the mainboard 300. However, with thinning development of the mobile phone, clearance in the mobile phone becomes smaller, and correspondingly, performance of the antenna 200 is greatly affected. Therefore, embodiments of this application provide an antenna, to improve antenna performance. The following describes the antenna provided in embodiments of this application with reference to specific accompanying drawings and embodiments.

Several concepts of coupling according to this application are first described. Details are as follows.

Figure 2:
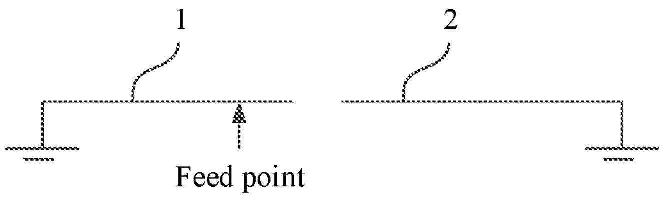
FIG. 2 to FIG. 4 are schematic illustrative diagrams of coupling between stubs of an antenna.
Figure 3:
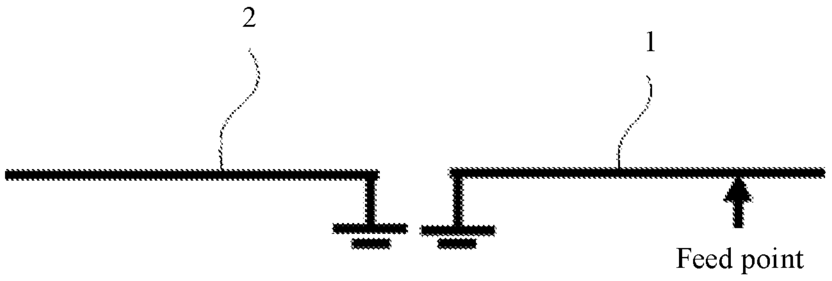
Figure 4:
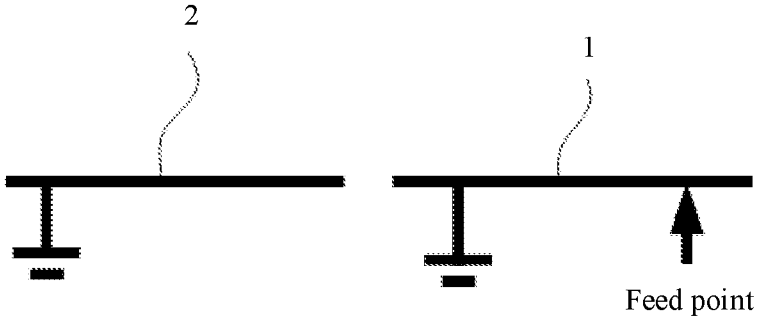

A main stub and a parasitic stub include ground-near ends and ground-distant ends. A ground point is disposed at the ground-near end, and the ground-distant end is far away from the ground point. The following types of coupling between the main stub and the parasitic stub are involved. In the antenna shown in FIG. 2, a ground-distant end of a main stub 1 is adjacent to and coupled to a ground-distant end of a parasitic stub 2, and the main stub 1 is coupled to the parasitic stub 2 by electric field coupling. In the antenna shown in FIG. 3, a ground-near end of the main stub 1 is adjacent to and coupled to a ground-near end of the parasitic stub 2 is adjacent and coupled, and the main stub 1 is coupled to the parasitic stub 2 by magnetic field coupling. In the antenna shown in FIG. 4, the ground-near end of the main stub 1 is adjacent to and coupled to the ground-distant end of the parasitic stub 2, and the main stub 1 is coupled to the parasitic stub 2 by electric field and magnetic field coupling. Alternatively, the ground-distant end of the main stub 1 is adjacent to and coupled to the ground-near end of the parasitic stub 2, and the main stub 1 is coupled to the parasitic stub 2 by electric field and magnetic field coupling.

For ease of description, in embodiments of this application, an end that is of a radiator and that is close to the ground point is referred to as a ground end, and an end that is of the radiator and that is away from the ground is referred to as a free end.

Figure 5:
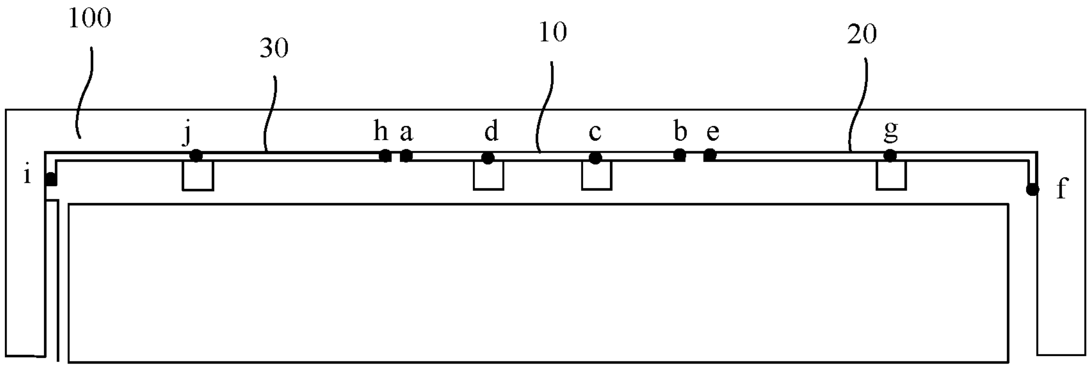
FIG. 5 is a schematic diagram of a structure of an antenna according to an embodiment of this application.

FIG. 5 is a schematic diagram of a structure of an antenna according to an embodiment of this application. The antenna includes a main stub 10, a first parasitic stub 20, and a second parasitic stub 30. The main stub 10 is configured as a main radiation structure of the antenna, and the first parasitic stub 20 and the second parasitic stub 30 are separately coupled to the main stub 10, to expand bandwidth of the antenna.

The main stub 10 may be of a long-strip-shaped metal structure. The main stub 10 may be a metal frame of the mobile terminal, may be structures such as an embedded metal layer, a laser forming structure, and a flexible circuit board that are in the housing 100 of the mobile terminal, or may be another metal structure in the housing 100. Two ends of the main stub 10 are respectively a first end a and a second end b. A feed point c is disposed at a position that is of the main stub 10 and that is close to the second end b, and the feed point c is configured to connect to a feed line. A first ground point d is disposed at a position that is of the main stub 10 and that is close to the first end a, and the first ground point d is configured to connect to a ground cable. A length (a current path length) of the main stub 10 is not specifically limited in this application, and a specific length of the main stub 10 may be adjusted based on an operating frequency of the antenna.

The first parasitic stub 20 may be a parasitic stub configured to excite resonances in two different modes. As shown in FIG. 5, the first parasitic stub 20 may be of a long-strip-shaped structure. The first parasitic stub 20 may be a metal frame of the mobile terminal, may be structures such as an embedded metal layer, a laser forming structure, and a flexible circuit board that are in the housing 100 of the mobile terminal, or may be another metal structure in the housing 100. The first parasitic stub 20 has a third end e and a fourth end f A second ground point g is disposed at a location that is of the first parasitic stub 20 and that is away from the third end e. There is a gap between the third end e of the first parasitic stub 20 and the second end b of the main stub 10. The first parasitic stub 20 is coupled to the main stub 10 via the gap between the second end b and the third end e. Because both the second end b and the third end e are free ends, the first parasitic stub 20 may be coupled to the main stub 10 by electric field coupling.

In an optional solution, an end that is of the first parasitic stub 20 and that is away from the main stub 10 has a bending structure, and the bending structure may be a bending structure formed along a shape in the housing 100 of the mobile phone. In allowed space in the housing 100 of the mobile phone, the first parasitic stub 20 may be bent along the space in the housing 100 of the mobile phone, to ensure a current path length of the first parasitic stub 20.

The second parasitic stub 30 may be a parasitic stub configured to excite resonances in two different modes. As shown in FIG. 5, the second parasitic stub 30 may be of a long-strip-shaped structure, and the second parasitic stub 30 has a fifth end h and a sixth end i. A third ground point j is disposed at a location that is of the second parasitic stub 30 and that is away from the fifth end h. There is a gap between the fifth end h of the second parasitic stub 30 and the first end a of the main stub 10. The second parasitic stub 30 is coupled to the main stub 10 via the gap between the first end a and the fifth end h. Because the fifth end h is a free end, and the first end a is a ground end, the second parasitic stub 30 may be coupled to the main stub 10 by electric field and magnetic field coupling.

In an optional solution, an end that is of the second parasitic stub 30 and that is away from the main stub 10 has a bending structure, and the bending structure may be a bending structure formed along a shape in the housing 100 of the mobile phone. In allowed space in the housing 100 of the mobile phone, the second parasitic stub 30 may be bent along the space in the housing 100 of the mobile phone, to ensure a current path length of the second parasitic stub 30.

In an optional solution, a tunable component or a fixed component may be connected between the second ground point g and the third ground point j. For example, the fixed component may be any one of a fixed resistor, a fixed capacitor, a fixed inductor component, a distributed inductor, a distributed capacitor, or a filter circuit, and the tunable component may be a switch or a variable capacitor. Any one of the foregoing components may be selectively connected to the second ground point g and the third ground point j, to adjust the current path lengths of the first parasitic stub 20 and the second parasitic stub 30. During specific connection, different components may be selected for connection in different connection manner: The second ground point g is connected to the fixed component, and the third ground point j is connected to the fixed component. Alternatively, the second ground point g is connected to the tunable component, and the third ground point j is connected to the tunable component. Alternatively, the second ground point g is connected to the fixed component, and the third ground point j is connected to the tunable component. Alternatively, the second ground point g is connected to the tunable component, and the third ground point j is connected to the fixed component.

Figure 6:
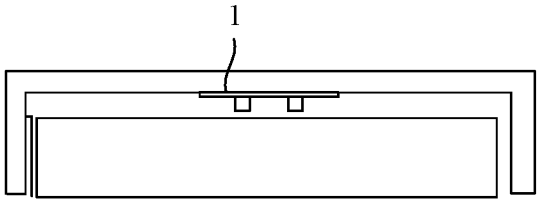
FIG. 6 is a schematic diagram of a structure of a specific antenna in the conventional technology.
Figure 7:
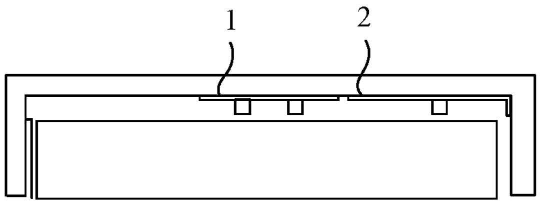
FIG. 7 is a schematic diagram of a structure of another specific antenna in the conventional technology.

For ease of understanding a difference between an effect of the antenna provided in embodiments of this application and an effect of an antenna in the conventional technology, simulation is performed on the antenna in the conventional technology and the antenna provided in embodiments of this application. FIG. 6 shows a structure of a specific antenna in the conventional technology. The antenna shown in FIG. 6 includes only a main stub 1. For ease of description, the antenna shown in FIG. 6 is referred to as Case 1. The antenna shown in FIG. 7 includes a main stub 1 and a first parasitic stub 2, and the main stub 1 is coupled to the first parasitic stub 2 in an electric field coupling manner. For ease of description, the antenna shown in FIG. 7 is referred to as Case 2. The antenna shown in FIG. 5 in this application is referred to as Case 3.

Figure 8:
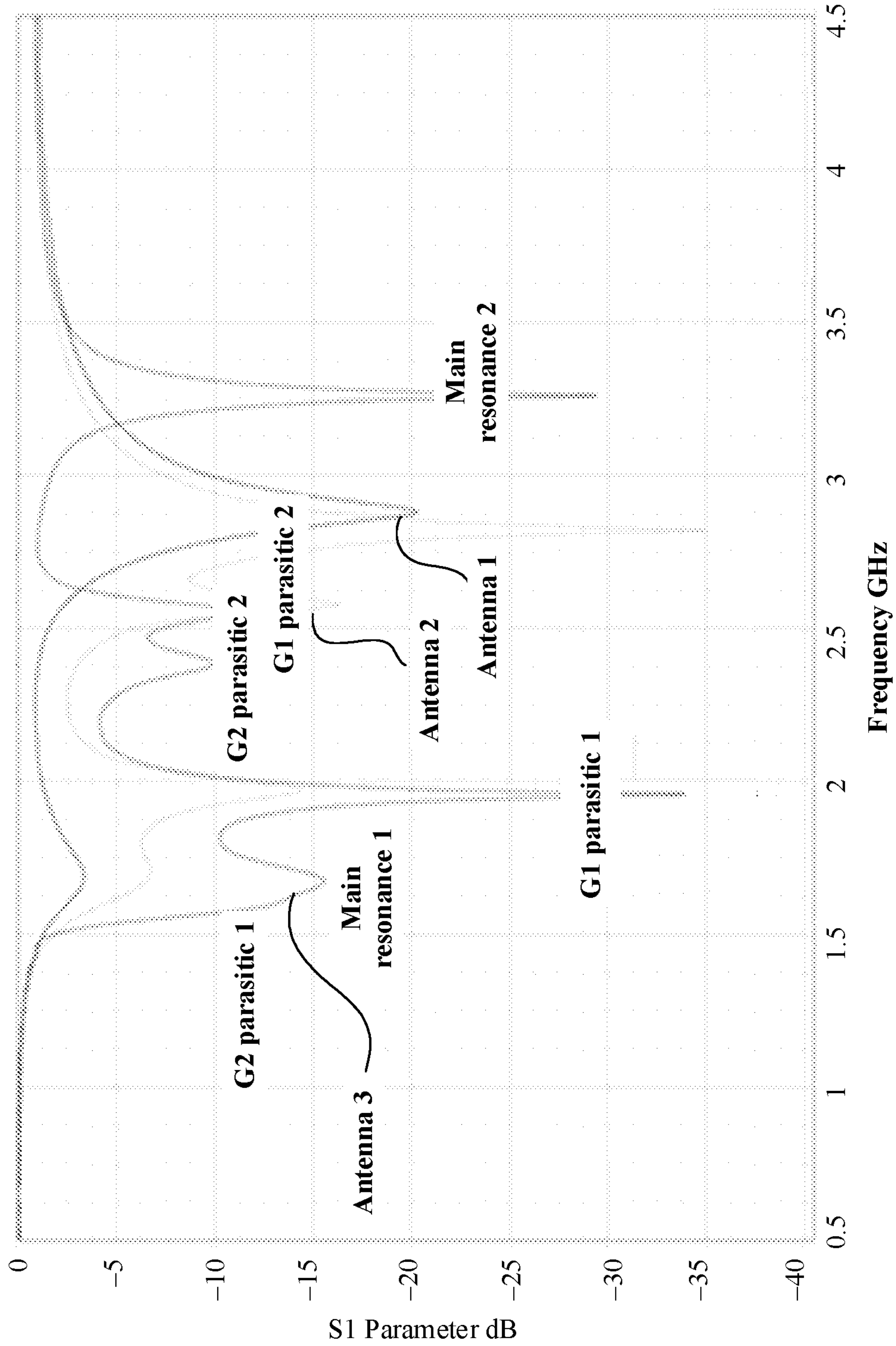
FIG. 8 is a schematic simulation diagram of three types of antennas.

FIG. 8 shows a simulation diagram of three types of antennas. The main stub in Case 1 may be configured to excite two resonance modes. A first resonance is in a ¼ mode of the main stub, and a second resonance is in a ½ mode of the main stub. Case 2 may be considered as adding the first parasitic stub in the upper right corner based on Case 1. When Case 2 operates, in addition to the ½ mode of the main stub and the ¼ mode of the main stub, two new resonance modes are further excited by the first parasitic stub: a common mode and a differential mode of the first parasitic stub, which implements efficiency improvement and bandwidth expansion compared with Case 1. In addition to the main stub and the first parasitic stub, the antenna provided in this embodiment of this application may further include a second parasitic stub coupled to the main stub by electric field and magnetic field coupling. In this embodiment of this application, two resonance modes may be excited by the main stub, two resonance modes may be excited by the first parasitic stub, and two new resonance modes may be excited by the second parasitic stub: a common mode and a differential mode of the second parasitic stub. This can further improve main resonance efficiency and expand bandwidth, to implement full-band coverage of N3, N1, N41, and N77.

FIG. 9*a* to FIG. 9*f* are schematic diagrams of currents of an antenna in six modes according to an embodiment of this application.

Figure 9A:
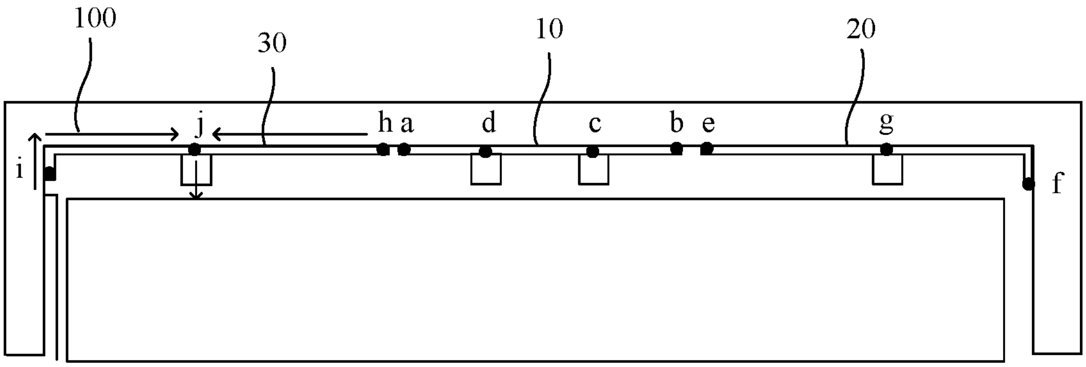
FIG. 9*a* to FIG. 9*f* are schematic diagrams of currents of an antenna in different modes according to an embodiment of this application.

First, refer to FIG. 9*a*. A current flows from the fifth end h and the sixth end i of the second parasitic stub 30 to the third ground point j. The current excites the common mode of the second parasitic stub 30. Refer to FIG. 8. A resonance in the common mode excited by the second parasitic stub 30 is at 1.6 GHz.

Figure 9B:
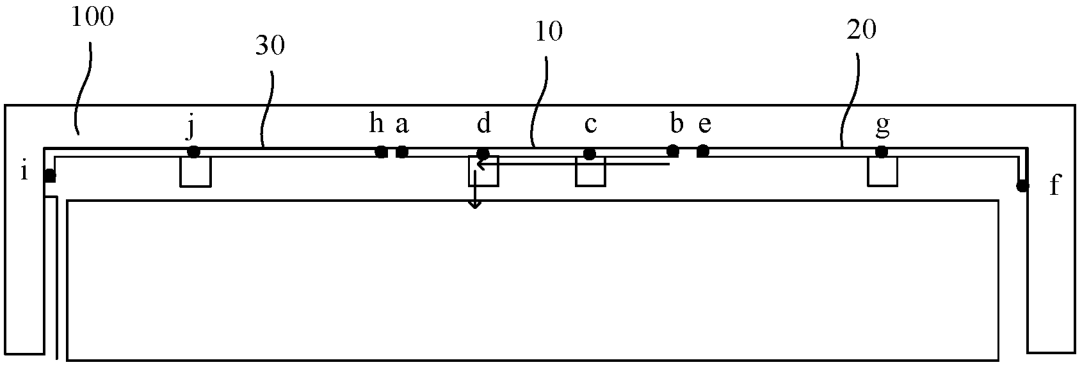

Refer to FIG. 9*b*. A current flows from the second end b of the main stub 10 to the first ground point d. The current excites the ¼ mode of the main stub 10. Refer to FIG. 8. A resonance in the ¼ mode excited by a circuit on the main stub 10 is at 1.7 GHz.

Figure 9C:
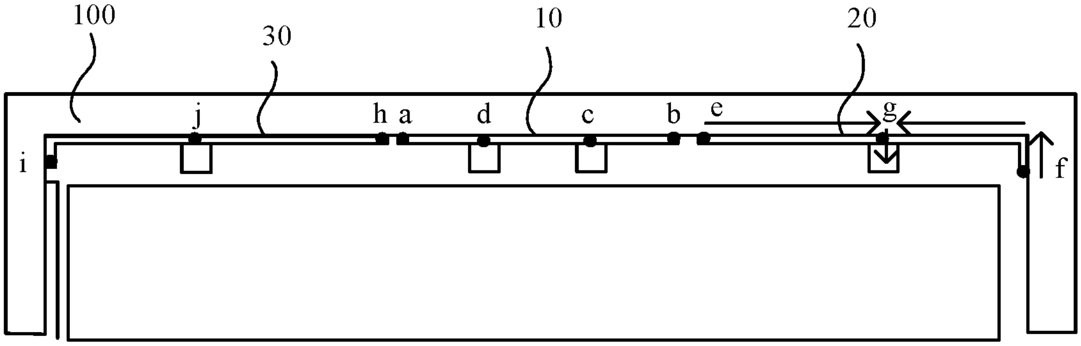

Refer to FIG. 9*c*. A current flows from the fourth end f of the first parasitic stub 20 to the second ground point g, and flows from the third end e to the second ground point g simultaneously. The current excites the common mode of the first parasitic stub 20. Refer to FIG. 8. A resonance in the common mode excited by the first parasitic stub 20 is at 1.95 GHz.

Figure 9D:
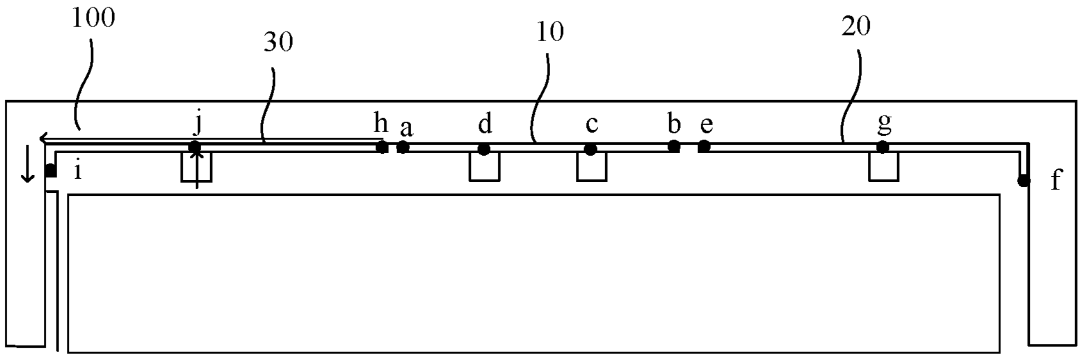

Refer to FIG. 9*d*. A current flows from the fifth end h of the second parasitic stub 30 to the sixth end i, and flows from the third ground point j to the sixth end i simultaneously. The current excites the differential mode of the second parasitic stub 30. Refer to FIG. 8. A resonance in the differential mode excited by the second parasitic stub 30 is at 2.35 GHz.

Figure 9E:
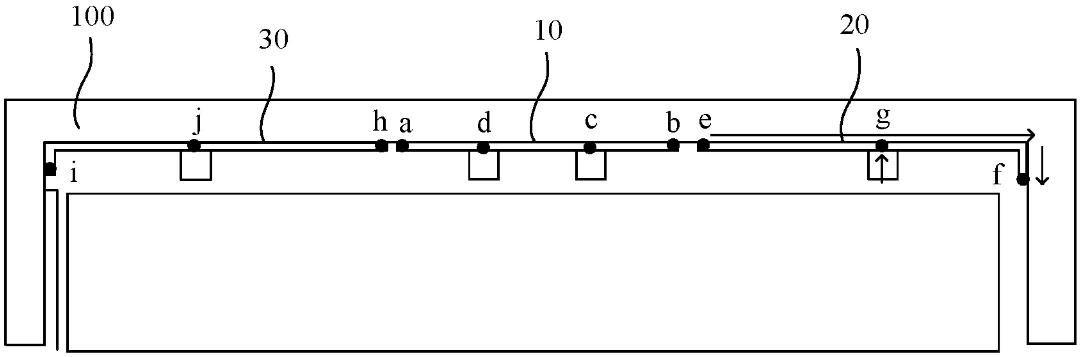

Refer to FIG. 9*e*. A current flows from the third end e of the first parasitic stub 20 to the fourth end f, and simultaneously, the current flows from the second ground point g to the fourth end f. The current excites the differential mode of the first parasitic stub 20. Refer to FIG. 8. A resonance in the differential mode excited by the first parasitic stub 20 is at 2.55 GHz.

Figure 9F:
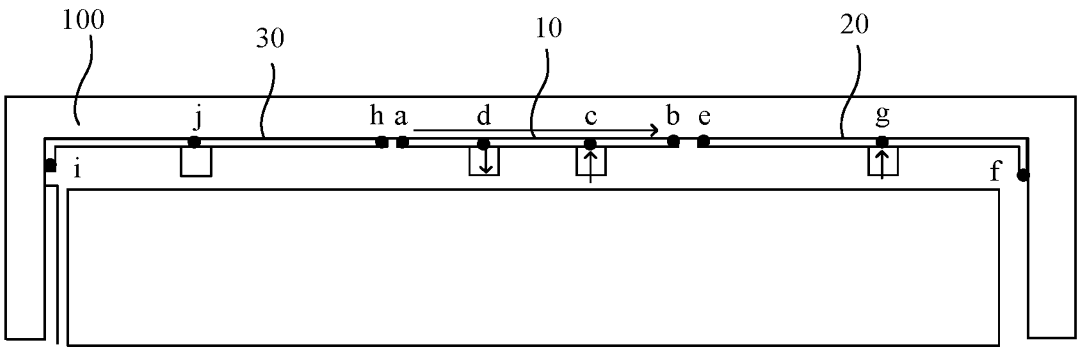

Refer to FIG. 9*f* A current flows from the first end a of the main stub 10 to the second end b and the first ground point d, and simultaneously, the current flows from the feed point c to the second end b. The current excites the ½ mode of the main stub 10. Refer to FIG. 8. A resonance in the ½ mode excited by the circuit on the main stub 10 is at 3.3 GHz.

Refer to FIG. 9*a* to FIG. 9*e* and FIG. 8. It can be learned that when the first parasitic stub 20 and the second parasitic stub 30 are used, the main stub 10 may be configured to excite two resonance modes. The first parasitic stub 20 is configured to excite two resonances, and a frequency of the resonance excited by the first parasitic stub 20 is greater than a frequency of the resonance excited by the main stub 10. The second parasitic stub 30 may be configured to excite two resonances, and a frequency of the resonance excited by the second parasitic stub 30 is less than a frequency of the resonance excited by the main stub 10. Two different resonances are excited by the first parasitic stub 20 and the second parasitic stub 30, to improve the antenna performance. This can further improve main resonance efficiency and expand bandwidth, to implement full-band coverage of N3, N1, N41, and N77.

Figure 10:
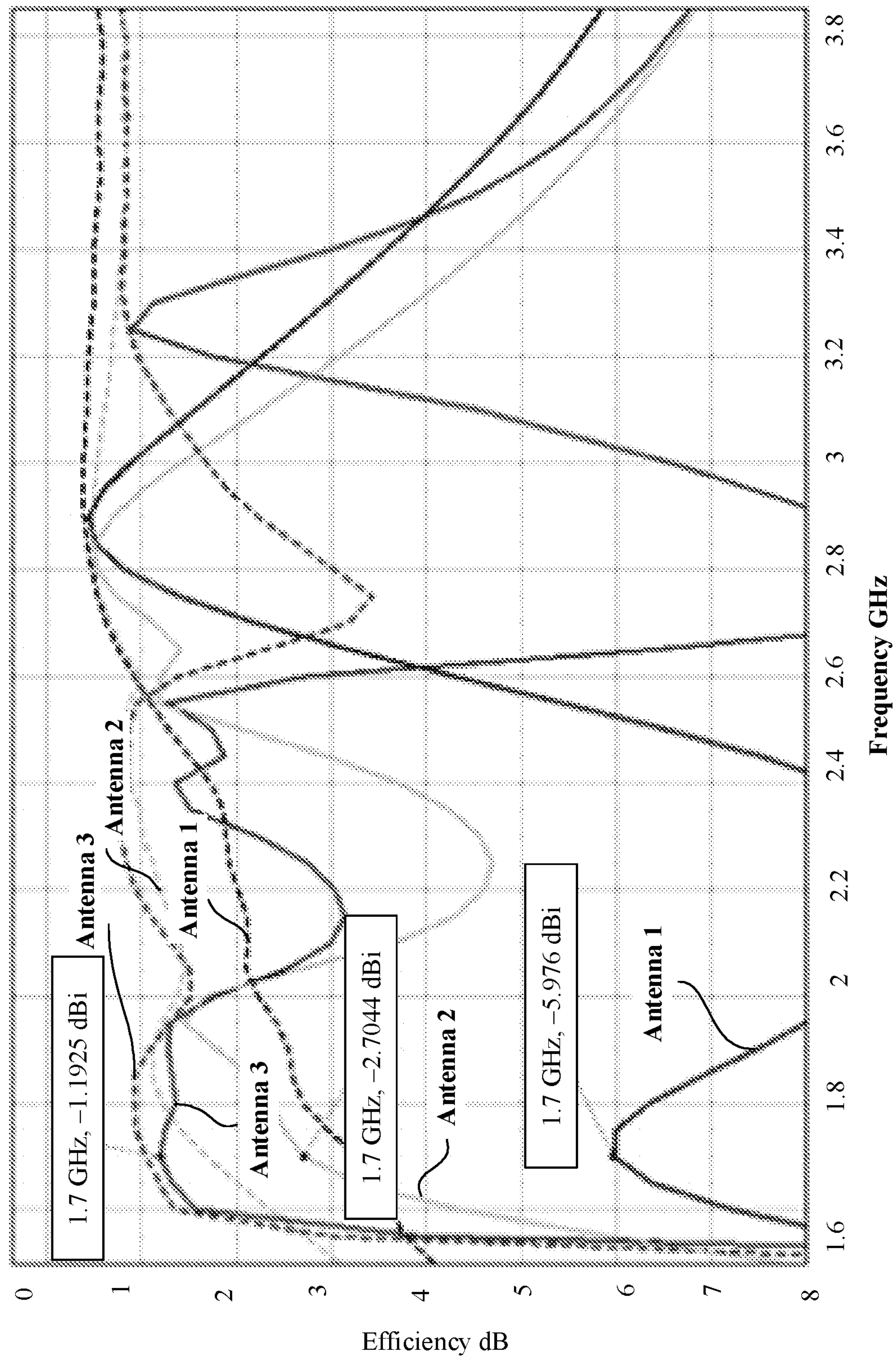
FIG. 10 is a schematic diagram of efficiency of three types of antennas.

For ease of understanding effects of the antennas shown in FIG. 6 and FIG. 7 and the antenna in this application, simulation comparison is performed on the three antennas. A result is shown in FIG. 10. A solid line indicates system efficiency, and a dashed line indicates radiation efficiency. It can be learned from FIG. 10 that both system efficiency and radiation efficiency of Case 1 and Case 2 range from 1.5 GHz to 2.2 GHz, and are less than system efficiency and radiation efficiency of Case 3 provided in this embodiment of this application.

Figure 11:
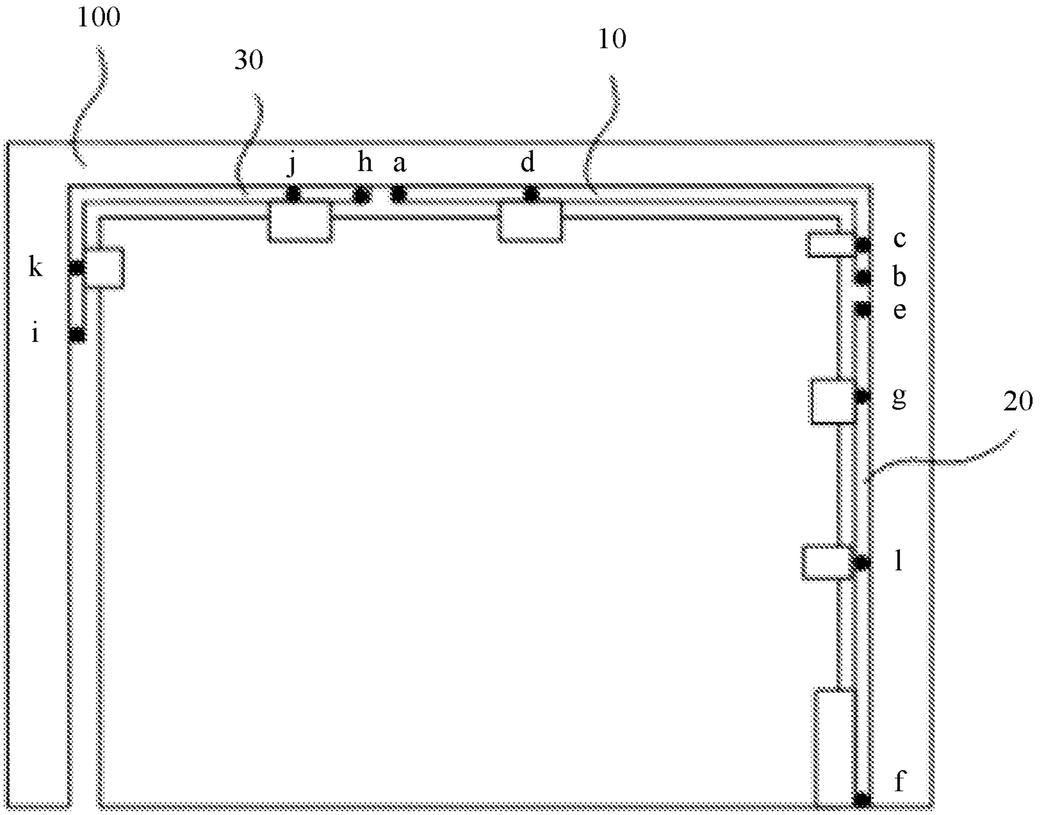
FIG. 11 is a schematic diagram of a structure of another antenna according to an embodiment of this application.

FIG. 11 is a schematic diagram of a structure of another antenna according to an embodiment of this application. The antenna includes a main stub 10, a first parasitic stub 20, and a second parasitic stub 30. The main stub 10 is configured as a main radiation structure of the antenna, and the first parasitic stub 20 and the second parasitic stub 30 are separately coupled to the main stub 10, to expand bandwidth of the antenna.

The main stub 10 may be of a long-strip-shaped metal structure. The main stub 10 may be a metal frame of the mobile terminal, may be structures such as an embedded metal layer, a laser forming structure, and a flexible circuit board that are in the housing 100 of the mobile terminal, or may be another metal structure in the housing 100. Two ends of the main stub 10 are respectively a first end a and a second end b. A feed point c is disposed at a position that is of the main stub 10 and that is close to the second end b, and the feed point c is configured to connect to a feed line. A first ground point d is disposed at a position that is of the main stub 10 and that is close to the first end a, and the first ground point d is configured to connect to a ground cable. A length (a current path length) of the main stub 10 is not specifically limited in this application, and a specific length of the main stub 10 may be adjusted based on an operating frequency of the antenna.

In an optional solution, the main stub 10 has a length extending to an edge of the housing 100 of the mobile phone, and has a bending structure, to ensure a current path length of the main stub 10.

The first parasitic stub 20 is a parasitic stub configured to excite resonances in two different modes. As shown in FIG. 11, the first parasitic stub 20 may be a metal frame of the mobile terminal, may be structures such as an embedded metal layer, a laser forming structure, and a flexible circuit board that are in the housing 100 of the mobile terminal, or may be another metal structure in the housing 100. The first parasitic stub 20 may be of a long-strip-shaped structure, and the first parasitic stub 20 has a third end e and a fourth end f. The first parasitic stub 20 has two ground points: a second ground point g and a fifth ground point 1. The second ground point g is disposed at a location that is of the first parasitic stub 20 and that is away from the third end e, and the fifth ground point 1 is disposed on a side that is of the first parasitic stub 20 and that is close to the fourth end f. The second ground point g is a short-circuit point of the first parasitic stub 20 when the first parasitic stub 20 operates at a high frequency, and the fifth ground point 1 is a short-circuit point of the first parasitic stub 20 when the first parasitic stub 20 operates at a low frequency. There is a gap between the third end e of the first parasitic stub 20 and the second end b of the main stub 10. The first parasitic stub 20 is coupled to the main stub 10 via the gap between the second end b and the third end e. Because both the second end b and the third end e are free ends, the first parasitic stub 20 may be coupled to the main stub 10 by electric field coupling.

The second parasitic stub 30 is a parasitic stub configured to excite resonances in two different modes. As shown in FIG. 11, the second parasitic stub 30 may be a metal frame of the mobile terminal, may be structures such as an embedded metal layer, a laser forming structure, and a flexible circuit board that are in the housing 100 of the mobile terminal, or may be another metal structure in the housing 100. The second parasitic stub 30 may be of a long-strip-shaped structure, and the second parasitic stub 30 has a fifth end h and a sixth end i. The second parasitic stub 30 has two ground points: a third ground point j and a fourth ground point k. The third ground point j is disposed at a location that is of the second parasitic stub 30 and that is close to the fifth end h, and the fourth ground point k is disposed on a side that is of the second parasitic stub 30 and that is close to the sixth end i. The third ground point j is a short-circuit point of the second parasitic stub 30 when the second parasitic stub 30 operates at a high frequency, and the fourth ground point k is a short-circuit point of the second parasitic stub 30 when the second parasitic stub 30 operates at a low frequency. There is a gap between the fifth end h of the second parasitic stub 30 and the first end a of the main stub 10. The second parasitic stub 30 may be coupled to the main stub 10 via the gap between the first end a and the fifth end h. Because the fifth end h is a free end, and the first end a is a ground end, the second parasitic stub 30 may be coupled to the main stub 10 by electric field and magnetic field coupling.

In an optional solution, an end that is of the second parasitic stub 30 and that is away from the main stub 10 has a bending structure, and the bending structure is a bending structure formed along a shape in the housing 100 of the mobile phone. In allowed space in the housing 100 of the mobile phone, the second parasitic stub 30 may be bent along the space in the housing 100 of the mobile phone, to ensure a current path length of the second parasitic stub 30.

In an optional solution, a tunable component or a fixed component may be connected between the second ground point g, the third ground point j, the fifth ground point 1, and the fourth ground point k. For example, the fixed component may be any one of a fixed resistor, a fixed capacitor, a fixed inductor component, a distributed inductor, a distributed capacitor, or a filter circuit, and the tunable component may be a switch or a variable capacitor. Any one of the foregoing components may be selectively connected to the second ground point g, the third ground point j, the fifth ground point 1, and the fourth ground point k, to adjust the current path lengths of the first parasitic stub 20 and the second parasitic stub 30.

FIG. 12*a* to FIG. 12*f* are schematic simulation diagrams of currents of an antenna.

Figure 12A:
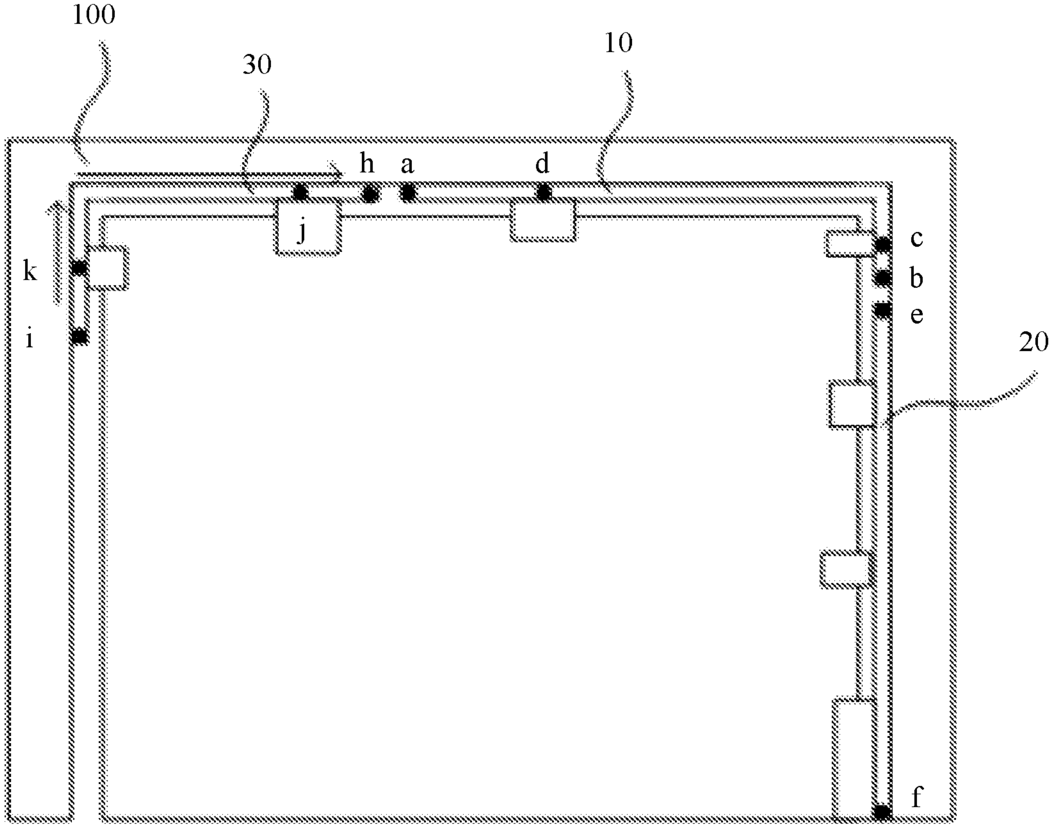
FIG. 12*a* to FIG. 12*f* are schematic simulation diagrams of currents of an antenna according to an embodiment of this application.

First, refer to FIG. 12*a*. A current flows from the sixth end i of the second parasitic stub 30 to the fifth end h. The current excites a ¼ mode of the second parasitic stub 30. A resonance in the ¼ mode excited by the second parasitic stub 30 is at 0.89 GHz.

Figure 12B:
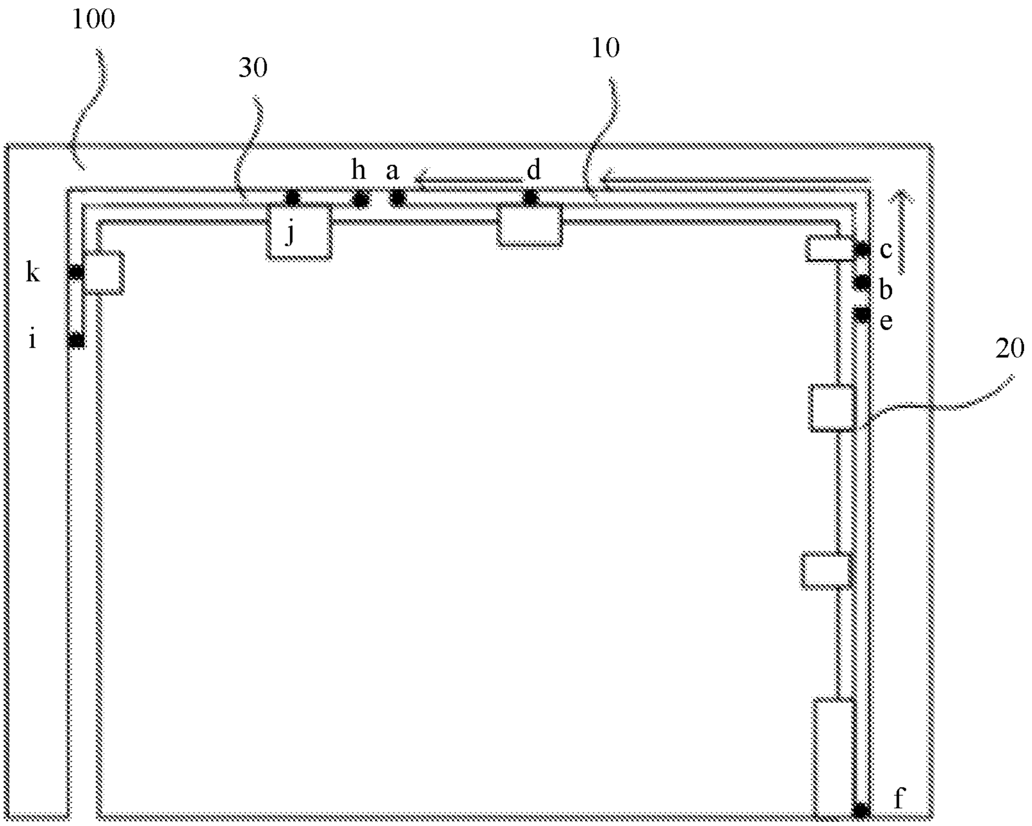

Refer to FIG. 12*b*. A current flows from the second end b of the main stub 10 to the first end a. The current excites a ¼ mode of the main stub 10. A resonance in the ¼ mode excited by the circuit on the main stub 10 is at 0.93 GHz.

Figure 12C:
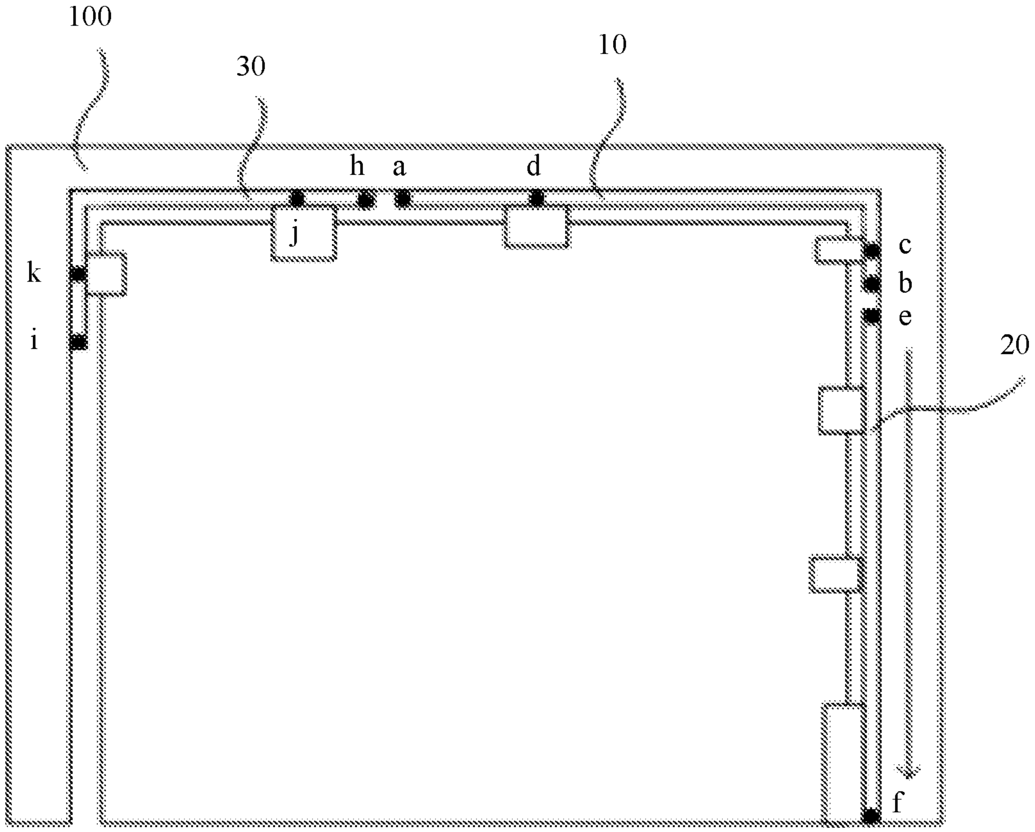

Refer to FIG. 12*c*. A current flows from the third end e of the first parasitic stub 20 to the fourth end f. The current excites a ¼ mode of the first parasitic stub 20. A resonance in the ¼ mode excited by the first parasitic stub 20 is at 1.01 GHz.

Figure 12D:
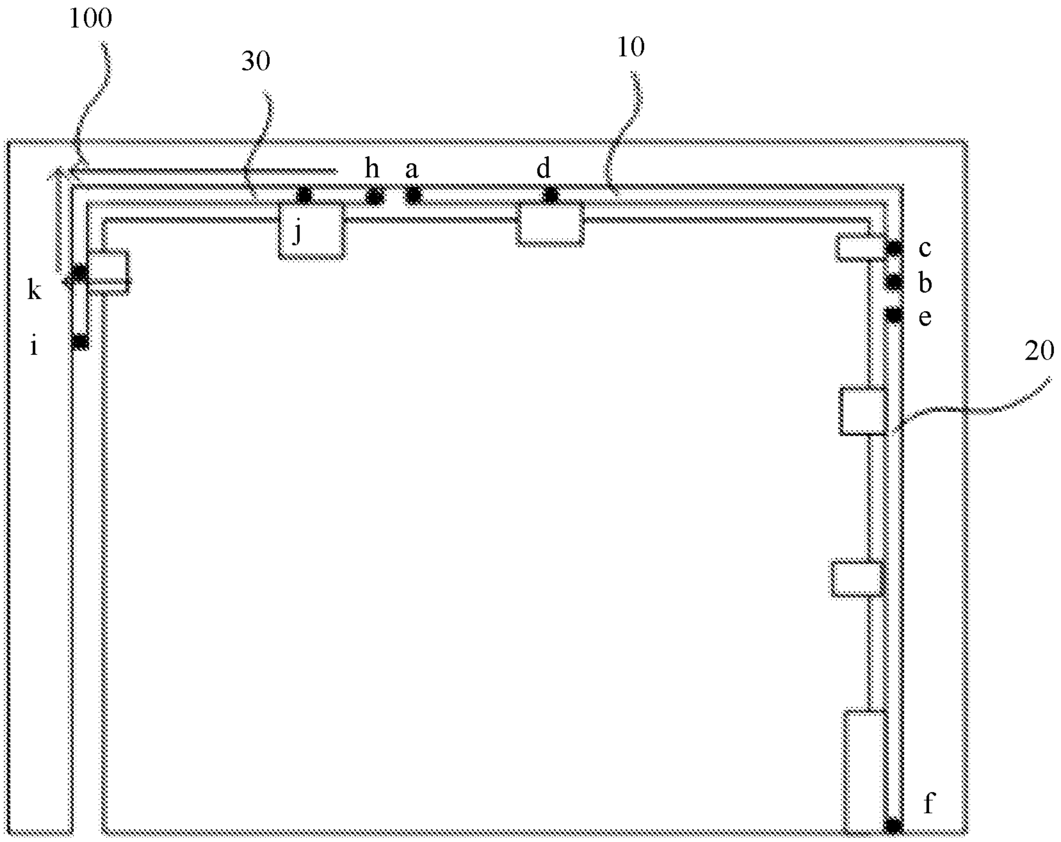

Refer to FIG. 12*d*. A current flows from the fourth ground point k of the second parasitic stub 30 to the fifth end h. The current excites a ¾ mode of the second parasitic stub 30, and a resonance in the ¾ mode excited by the second parasitic stub 30 is at 2.6 GHz.

Figure 12E:
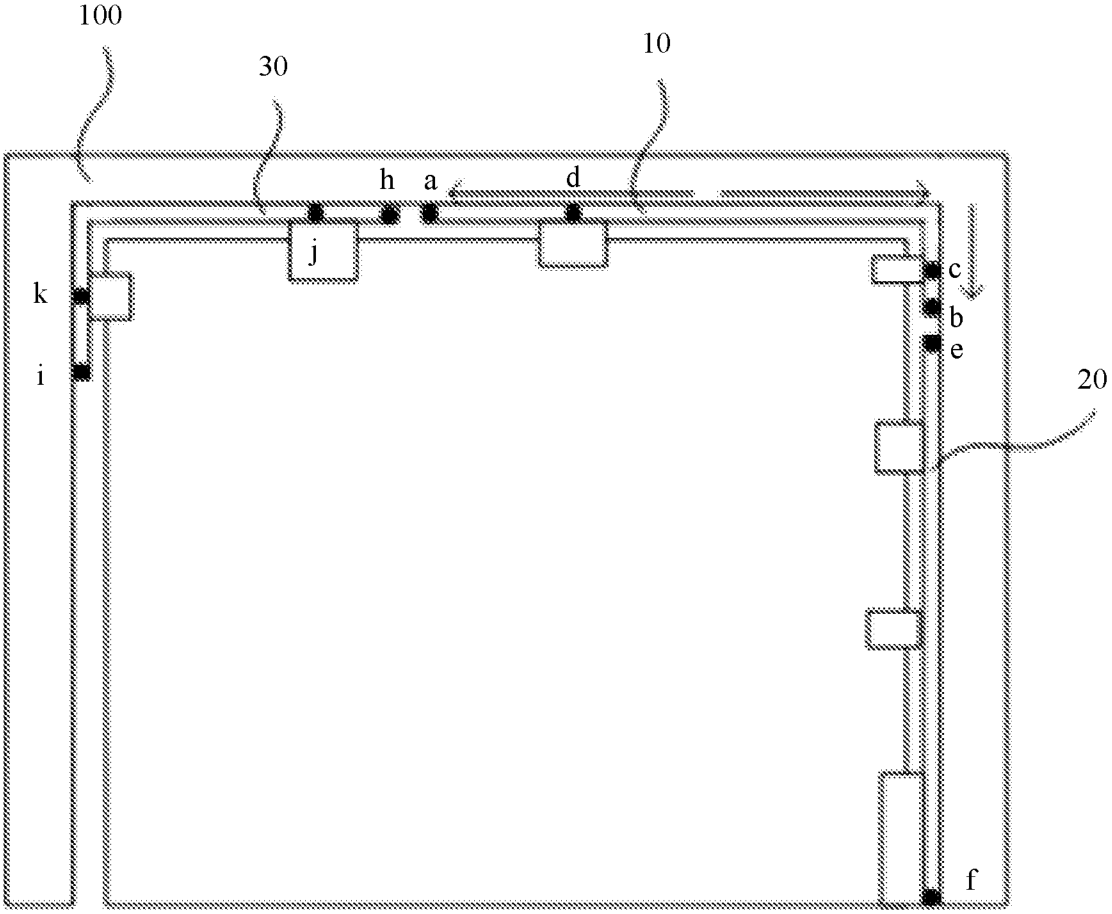

Refer to FIG. 12*e*. A current flows from the main stub 10 to the first end a and the second end b respectively. The current excites a ¾ mode of the main stub 10, and a resonance in the ¾ mode excited by the main stub 10 is at 2.7 GHz.

Figure 12F:
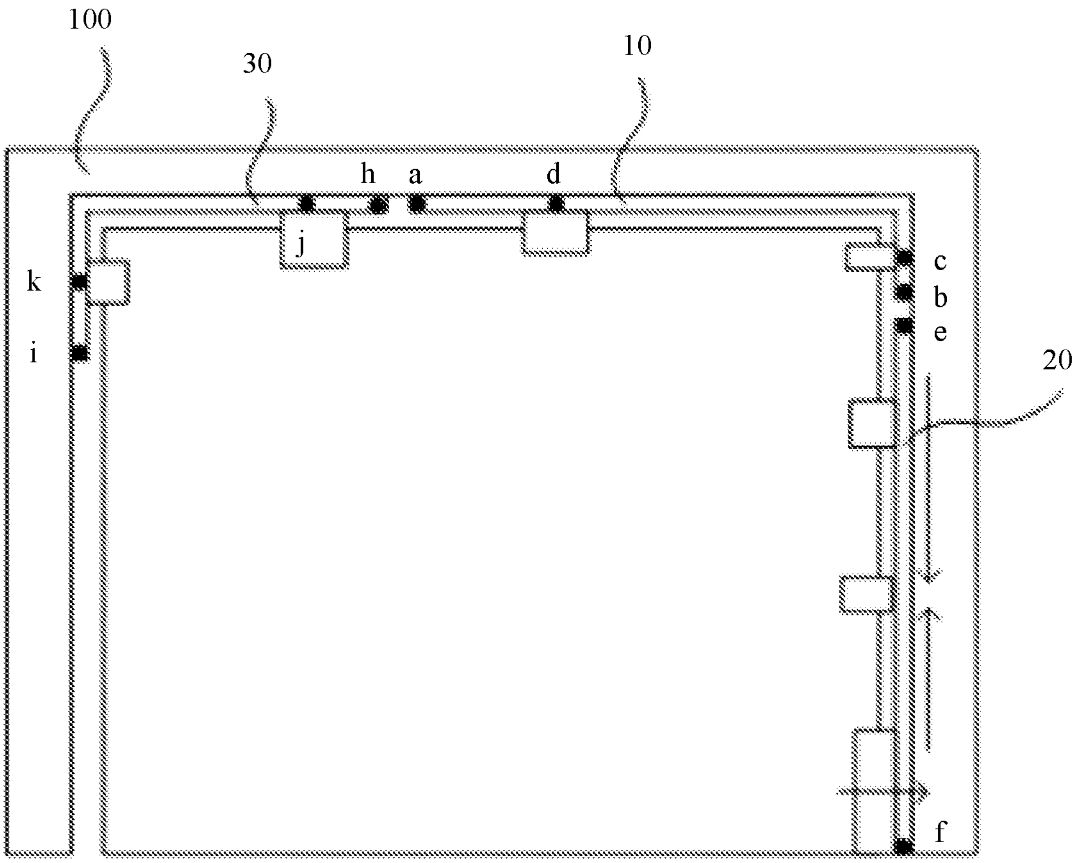

Refer to FIG. 12*f* A current flows from the third end e of the first parasitic stub 20 to the middle, and flows from the fifth ground point 1 to the middle simultaneously. The current excites a ¾ mode of the first parasitic stub 20, and a resonance in the ¾ mode excited by the first parasitic stub 20 is at 2.75 GHz.

Refer to FIG. 12*a* to FIG. 12*e*. It can be learned that when the first parasitic stub 20 and the second parasitic stub 30 are used, the main stub 10 may be configured to excite two resonance modes. The first parasitic stub 20 is configured to excite two resonances, and a frequency of the resonance excited by the first parasitic stub 20 is greater than a frequency of the resonance excited by the main stub 10. The second parasitic stub 30 may be configured to excite two resonances, and a frequency of the resonance excited by the second parasitic stub 30 is less than a frequency of the resonance excited by the main stub 10.

It can be learned from the foregoing that when the first parasitic stub 20 and the second parasitic stub 30 provided in this embodiment of this application operate, the resonances in the two different modes may include any two of a resonance in a ¼λ mode, a resonance in a ½λ mode, a resonance in a ¾λ mode, or a resonance in a λ mode. λ is a wavelength corresponding to an operating frequency of the antenna.

The ¼ mode of the first parasitic stub 20 is configured to improve efficiency of an original low-frequency resonance after the ¼ mode of the main stub 10, and the ¾ mode of the first parasitic stub 20 is configured to improve efficiency of an original high-frequency resonance after the ¾ mode of the main stub 10. The ¼ mode of the second parasitic stub 30 is configured to further improve efficiency and bandwidth of a low frequency before the ¼ mode of the main stub 10, and the ¾ mode of the second parasitic stub 30 is configured to further improve efficiency and bandwidth of a high frequency before the ¾ mode of the main stub 10. Antenna performance can be further improved.

Figure 13:
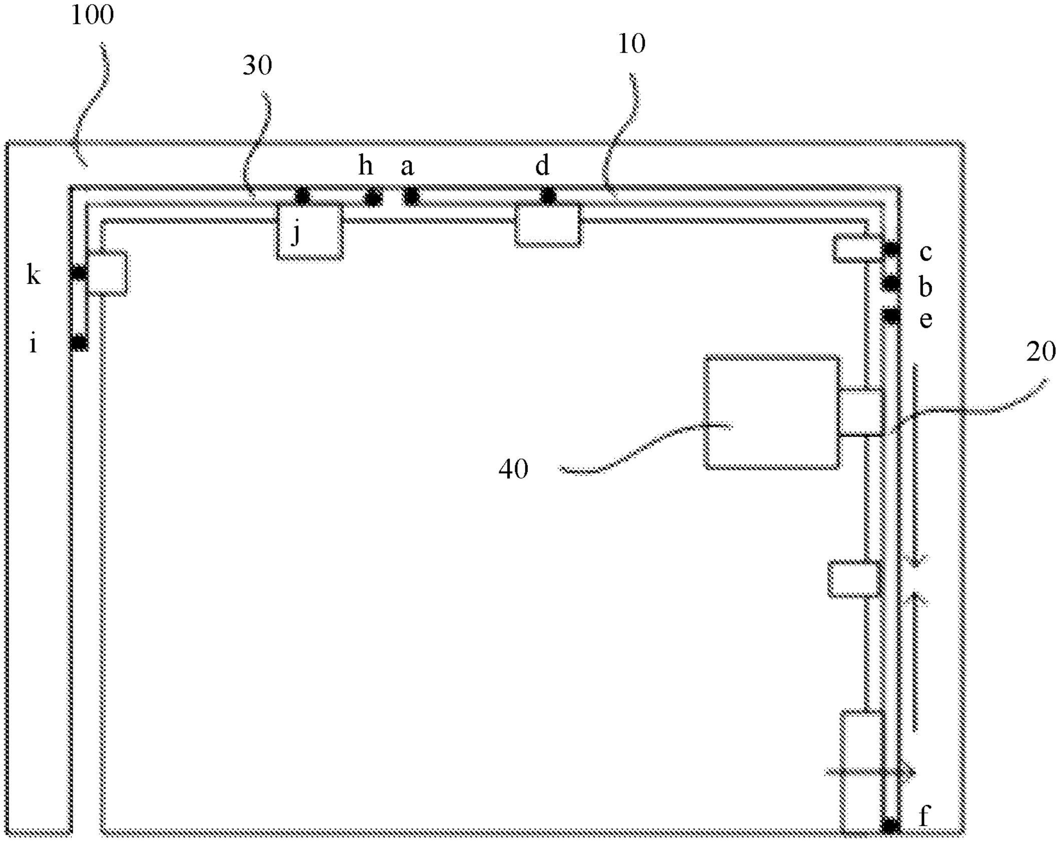
FIG. 13 is a schematic diagram of a structure of another antenna according to an embodiment of this application.

FIG. 13 is a schematic diagram of a structure of another antenna according to an embodiment of this application. For same reference numerals in FIG. 13, refer to the same reference numerals in FIG. 11. The antenna in FIG. 13 is a variant of the antenna shown in FIG. 11. A difference between the antenna shown in FIG. 13 and the antenna shown in FIG. 11 lies in that the second ground point g is connected to a high-pass low-cut filter circuit 40, and the first parasitic stub 20 generates a dual-mode resonance by the filter circuit 40. When the second ground point g of the first parasitic stub 20 is changed to the high-pass low-cut filter circuit 40, an effect of exciting a double resonance mode may also be achieved, except that a parasitic mode of the first parasitic stub 20 is changed from the original ¾ mode of the first parasitic stub 20 to a ¼ filtering mode in which the second ground point g returns to the ground.

Figure 14A:
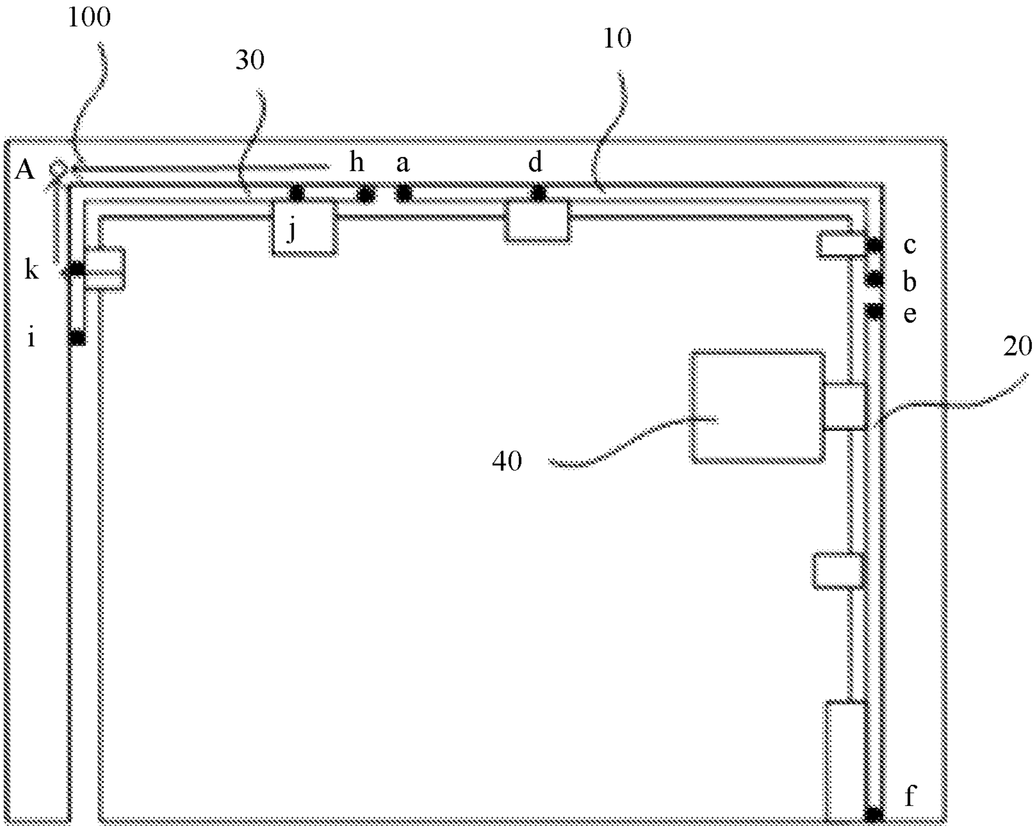
FIG. 14*a* to FIG. 14*c* are schematic simulation diagrams of currents of an antenna according to an embodiment of this application.
Figure 14B:
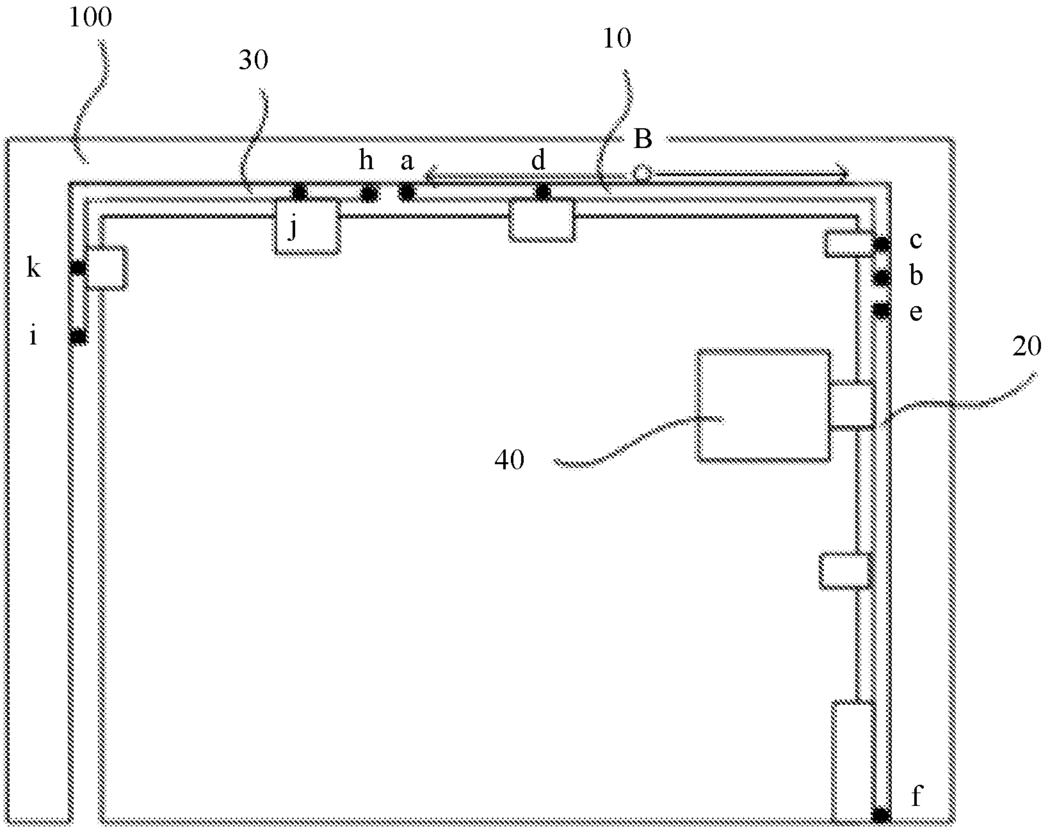
Figure 14C:
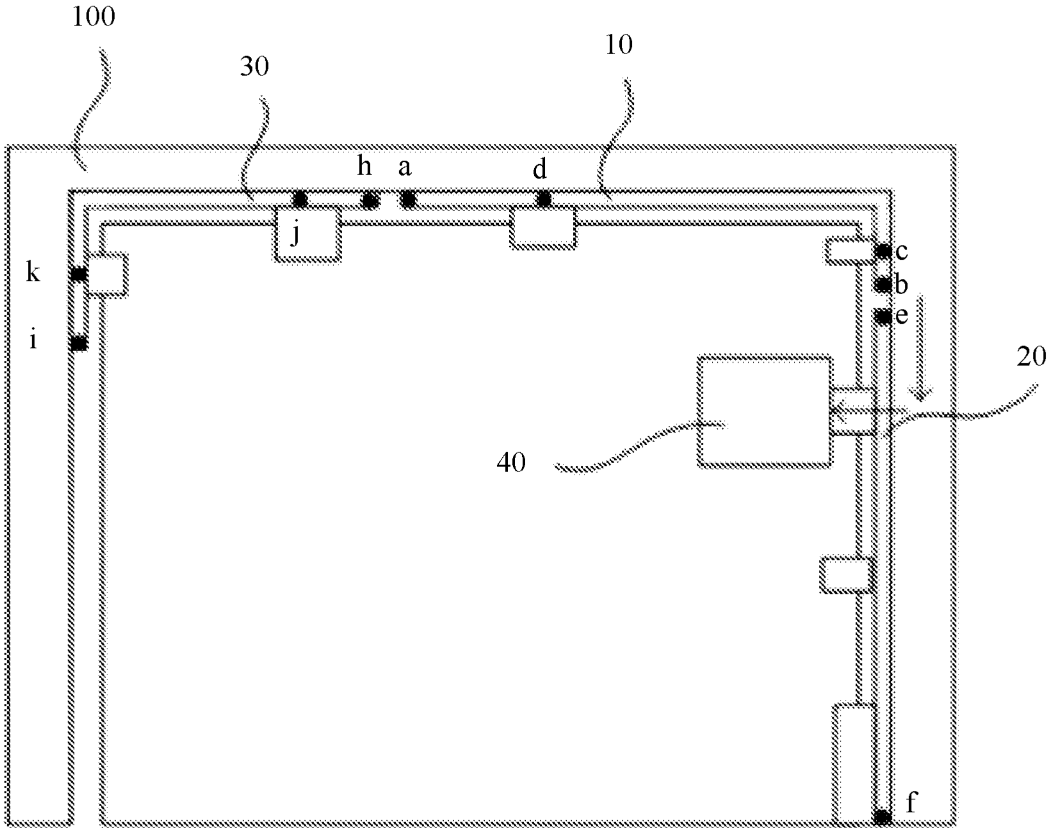

FIG. 14*a* to FIG. 14*c* show a current status of each stub on the antenna when a high frequency is configured. As shown in FIG. 14*a*, a current flows from the fourth ground point k of the second parasitic stub 30 to a point A, and a current flows from the fifth end h of the second parasitic stub 30 to the point A. A is a point with a strongest electric field. The foregoing currents excite the ¾ mode of the second parasitic stub 30. A resonance in the ¾ mode excited by the second parasitic stub 30 is at 2.6 GHz. As shown in FIG. 14*b*, a current flows from a point B of the main stub 10 to the first end a and the second end b, and the point B is a point with a strongest electric field. The foregoing current excites the ¾ mode of the second parasitic stub 30. A resonance in the ¾ mode excited by the main stub 10 is at 2.7 GHz. As shown in FIG. 14*c*, a current flows from the third end e of the first parasitic stub 20 to the first ground point d. The current excites the ¼ mode of the first parasitic stub 20. A resonance in the ¼ mode excited by the first parasitic stub 20 is at 2.8 GHz.

For a low-frequency resonance excited by each stub of the antenna shown in FIG. 13, refer to related descriptions in FIG. 11. FIG. 14*a* to FIG. 14*c* show only an example of a resonance in a high frequency band.

Figure 15:
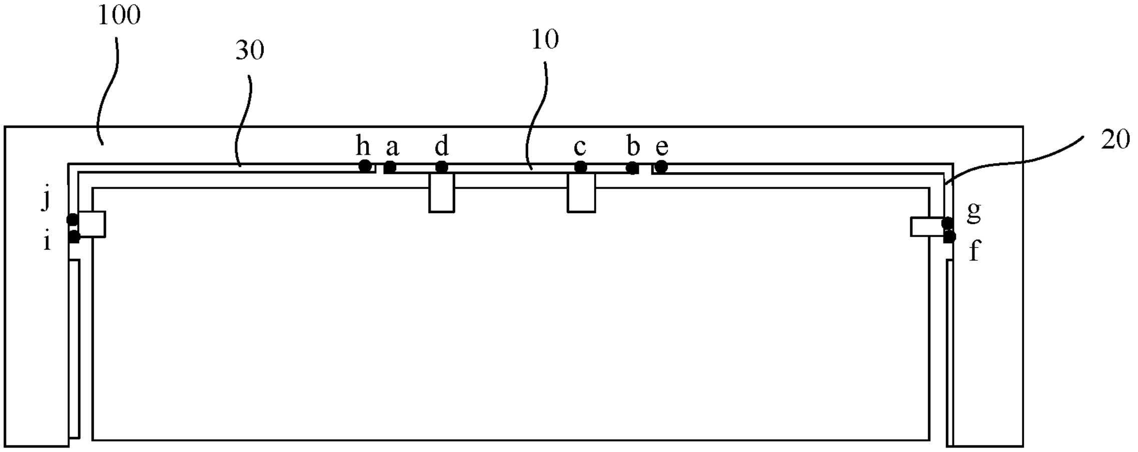
FIG. 15 is a schematic diagram of a structure of another antenna according to an embodiment of this application.

FIG. 15 is a schematic diagram of a structure of another antenna according to an embodiment of this application. The antenna includes a main stub 10, a first parasitic stub 20, and a second parasitic stub 30. The main stub 10 is configured as a main radiation structure of the antenna, and the first parasitic stub 20 and the second parasitic stub 30 are separately coupled to the main stub 10, to expand bandwidth of the antenna.

The main stub 10 may be of a long-strip-shaped metal structure. The main stub 10 may be a metal frame of the mobile terminal, may be structures such as an embedded metal layer, a laser forming structure, and a flexible circuit board that are in the housing 100 of the mobile terminal, or may be another metal structure in the housing 100. Two ends of the main stub 10 are respectively a first end a and a second end b. A feed point c is disposed at a position that is of the main stub 10 and that is close to the second end b, and the feed point c is configured to connect to a feed line. A first ground point d is disposed at a position that is of the main stub 10 and that is close to the first end a, the first ground point d is far away from the second end b, and the first ground point d is configured to connect to a ground cable. A length (a current path length) of the main stub 10 is not specifically limited in this application, and a specific length of the main stub 10 may be adjusted based on an operating frequency of the antenna.

The first parasitic stub 20 is a parasitic stub configured to excite a resonance in a first mode. As shown in FIG. 15, the first parasitic stub 20 may be of a long-strip-shaped structure, may be a metal frame of the mobile terminal, may be structures such as an embedded metal layer, a laser forming structure, and a flexible circuit board that are in the housing 100 of the mobile terminal, or may be another metal structure in the housing 100. The first parasitic stub 20 has a third end e and a fourth end f A second ground point g is disposed at a location that is of the first parasitic stub 20 and that is away from the third end e. There is a gap between the third end e of the first parasitic stub 20 and the second end b of the main stub 10. The first parasitic stub 20 is coupled to the main stub 10 via the gap between the second end b and the third end e. Because both the second end b and the third end e are free ends, the first parasitic stub 20 may be coupled to the main stub 10 by electric field coupling.

In an optional solution, an end that is of the first parasitic stub 20 and that is away from the main stub 10 has a bending structure, and the bending structure may be a bending structure formed along a shape in the housing 100 of the mobile phone. In allowed space in the housing 100 of the mobile phone, the first parasitic stub 20 may be bent along the space in the housing 100 of the mobile phone, to ensure a current path length of the first parasitic stub 20.

The second parasitic stub 30 is a parasitic stub that can be configured to excite a resonance in a second mode. As shown in FIG. 15, the second parasitic stub 30 may be of a long-strip-shaped structure, and the second parasitic stub 30 has a fifth end h and a sixth end i. A third ground point j is disposed at a location that is of the second parasitic stub 30 and that is away from the fifth end h. In other words, the third ground point j is far away from an end that is of the second parasitic stub 30 and that is close to the first end a. There is a gap between the fifth end h of the second parasitic stub 30 and the first end a of the main stub 10. The second parasitic stub 30 is coupled to the main stub 10 via the gap between the first end a and the fifth end h. Because the fifth end h is a free end, and the first end a is a ground end, the second parasitic stub 30 is coupled to the main stub 10 by electric field and magnetic field coupling.

In an optional solution, an end that is of the second parasitic stub 30 and that is away from the main stub 10 has a bending structure, and the bending structure is a bending structure formed along a shape in the housing 100 of the mobile phone. In allowed space in the housing 100 of the mobile phone, the second parasitic stub 30 may be bent along the space in the housing 100 of the mobile phone, to ensure a current path length of the second parasitic stub 30.

In an optional solution, a tunable component or a fixed component may be connected between the second ground point g and the third ground point j. For example, the fixed component may be any one of a fixed resistor, a fixed capacitor, a fixed inductor component, a distributed inductor, a distributed capacitor, or a filter circuit, and the tunable component may be a switch or a variable capacitor. Any one of the foregoing components may be selectively connected to the second ground point g and the third ground point j, to adjust the current path lengths of the first parasitic stub 20 and the second parasitic stub 30. During specific connection, different components may be selected for connection in different connection manner: The second ground point g is connected to the fixed component, and the third ground point j is connected to the fixed component. Alternatively, the second ground point g is connected to the tunable component, and the third ground point j is connected to the tunable component. Alternatively, the second ground point g is connected to the fixed component, and the third ground point j is connected to the tunable component. Alternatively, the second ground point g is connected to the tunable component, and the third ground point j is connected to the fixed component. In an optional solution, a selective switch may be further disposed at the second ground point g and the third ground point j, and different fixed components or tunable components are selected by using the selective switch. Switching may be implemented based on a requirement, to increase bandwidth of the antenna.

A resonance of the first mode and a resonance of the second mode may be the same or different. The following uses an example in which the resonance of the first mode and the resonance of the second mode are different, for illustration.

Figure 16A:
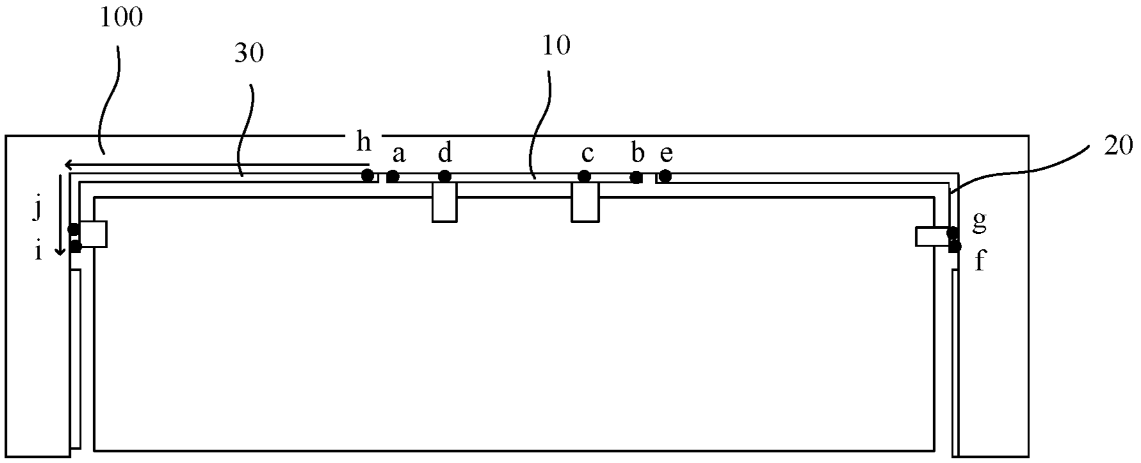
FIG. 16*a* to FIG. 16*c* are schematic diagrams of currents of an antenna according to an embodiment of this application.
Figure 16B:
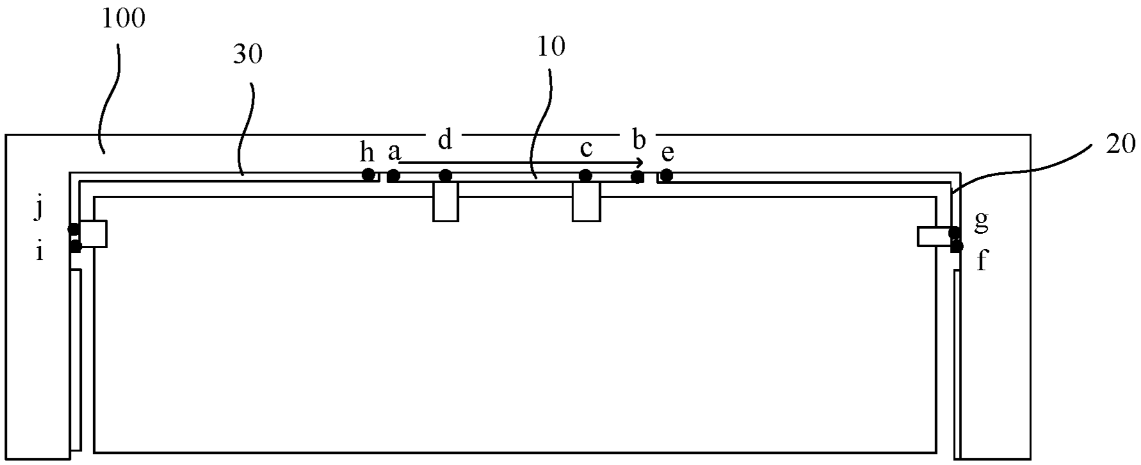
Figure 16C:
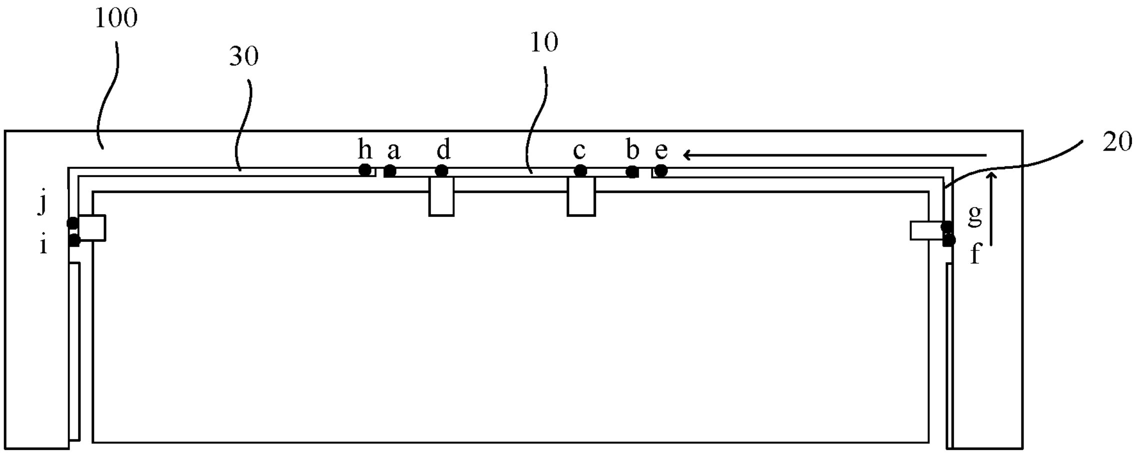

FIG. 16*a* to FIG. 16*c* are schematic diagrams of currents of an antenna according to an embodiment of this application.

First, refer to FIG. 16*a*. A current flows from the fifth end h of the second parasitic stub 30 to the third ground point j. The current excites the ½ mode of the second parasitic stub 30. A resonance in the ½ mode excited by the second parasitic stub 30 is at 1.6 GHz.

Refer to FIG. 16*b*. A current flows from the first end a of the main stub 10 to the second end b. The current excites the ¼ mode of the main stub 10. A resonance in the ¼ mode excited by the circuit on the main stub 10 is at 1.75 GHz.

Refer to FIG. 16*c*. A current flows from the fourth end f of the first parasitic stub 20 to the third end e. The current excites the ¼ mode of the first parasitic stub 20. A resonance in the ¼ mode excited by the first parasitic stub 20 is at 2.0 GHz.

It can be learned from the foregoing description that, the ¼ mode is excited by the main stub 10, the ½ mode (a small end capacitor 1 pF to the ground) is excited by the first parasitic stub 20 and placed after a main mode, so that in-band efficiency may be improved from −4.9 to −2.4, and a 5 mm body SAR decreases from 1.96 to 1.44. The ½ mode is excited by the second parasitic stub 30 and placed before the ¼ mode of the main stub 10 (a small end capacitor 3 pF to the ground), so that the in-band efficiency may be further improved from −2.4 to −1.5, and the 5 mm body SAR further decreases from 1.44 to 0.76. Bandwidth and efficiency of the antenna are improved.

In an optional solution, based on the antenna in FIG. 15, the fixed capacitors 3 pF and 1 pF are replaced with tunable components such as switches SW1 and SW2, so that switching between two parasitic ½ modes in a full frequency band below Sub6G can be implemented.

Figure 17:
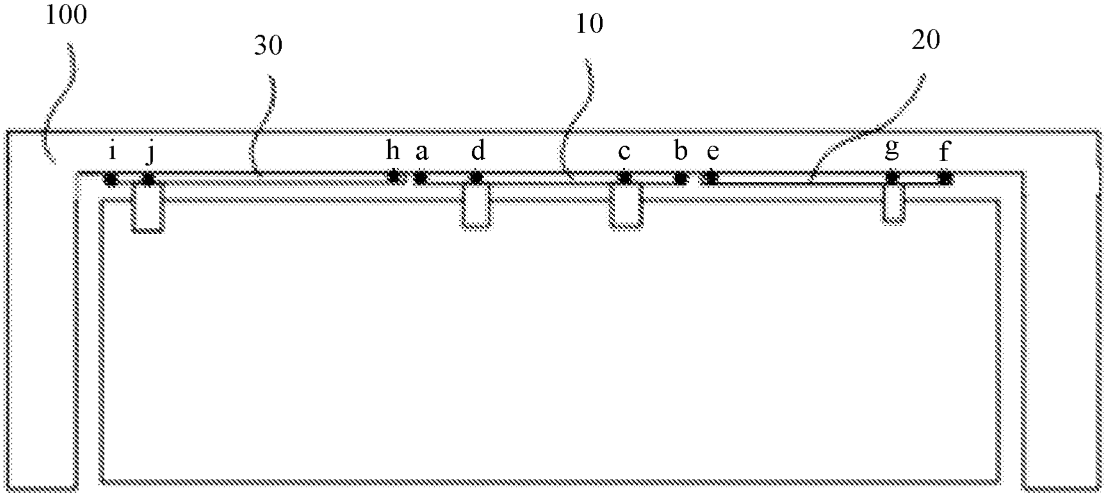
FIG. 17 is a schematic diagram of a structure of another antenna according to an embodiment of this application.

FIG. 17 is a schematic diagram of a structure of another antenna according to an embodiment of this application. The antenna includes a main stub 10, a first parasitic stub 20, and a second parasitic stub 30. The main stub 10 is configured as a main radiation structure of the antenna, and the first parasitic stub 20 and the second parasitic stub 30 are separately coupled to the main stub 10, to expand bandwidth of the antenna.

The main stub 10 is of a long-strip-shaped metal structure, may be a metal frame of the mobile terminal, may be structures such as an embedded metal layer, a laser forming structure, and a flexible circuit board that are in the housing 100 of the mobile terminal, or may be another metal structure in the housing 100. Two ends of the main stub 10 are respectively a first end a and a second end b. A feed point c is disposed at a position that is of the main stub 10 and that is close to the second end b, and the feed point c is configured to connect to a feed line. A first ground point d is disposed at a position that is of the main stub 10 and that is close to the first end a, the first ground point d is far away from the second end b, and the first ground point d is configured to connect to a ground cable. A length (a current path length) of the main stub 10 is not specifically limited in this application, and a specific length of the main stub 10 may be adjusted based on an operating frequency of the antenna.

The first parasitic stub 20 is a parasitic stub configured to excite a resonance in a first mode. As shown in FIG. 17, the first parasitic stub 20 is of a long-strip-shaped structure, may be a metal frame of the mobile terminal, may be structures such as an embedded metal layer, a laser forming structure, and a flexible circuit board that are embedded in the housing 100 of the mobile terminal, or may be another metal structure in the housing 100. The first parasitic stub 20 has a third end e and a fourth end f A second ground point g is disposed at a location that is of the first parasitic stub 20 and that is away from the third end e. There is a gap between the third end e of the first parasitic stub 20 and the second end b of the main stub 10. The first parasitic stub 20 is coupled to the main stub 10 via the gap between the second end b and the third end e. Because both the second end b and the third end e are free ends, the first parasitic stub 20 is coupled to the main stub 10 by electric field coupling.

The second parasitic stub 30 is a parasitic stub configured to excite a resonance in a second mode. As shown in FIG. 15, the second parasitic stub 30 is of a long-strip-shaped structure, and the second parasitic stub 30 has a fifth end h and a sixth end i. A third ground point j is disposed at a location that is of the second parasitic stub 30 and that is away from the fifth end h. In other words, the third ground point j is far away from an end that is of the second parasitic stub 30 and that is close to the first end a. There is a gap between the fifth end h of the second parasitic stub 30 and the first end a of the main stub 10. The second parasitic stub 30 is coupled to the main stub 10 via the gap between the first end a and the fifth end h. Because the fifth end h is a free end, and the first end a is a ground end, the second parasitic stub 30 is coupled to the main stub 10 by electric field and magnetic field coupling.

In an optional solution, a tunable component or a fixed component may be connected between the second ground point g and the third ground point j. For example, the fixed component may be any one of a fixed resistor, a fixed capacitor, a fixed inductor component, a distributed inductor, a distributed capacitor, or a filter circuit, and the tunable component may be a switch or a variable capacitor. Any one of the foregoing components may be selectively connected to the second ground point g and the third ground point j, to adjust the current path lengths of the first parasitic stub 20 and the second parasitic stub 30. During specific connection, different components may be selected for connection in different connection manner: The second ground point g is connected to the fixed component, and the third ground point j is connected to the fixed component. Alternatively, the second ground point g is connected to the tunable component, and the third ground point j is connected to the tunable component. Alternatively, the second ground point g is connected to the fixed component, and the third ground point j is connected to the tunable component. Alternatively, the second ground point g is connected to the tunable component, and the third ground point j is connected to the fixed component.

In an optional solution, a selective switch may be further disposed at the second ground point g and the third ground point j, and different fixed components or tunable components are selected by using the selective switch. Switching may be implemented based on a requirement, to increase bandwidth of the antenna.

A resonance of the first mode and a resonance of the second mode may be the same or different. The following uses an example in which the resonance of the first mode and the resonance of the second mode are different, for illustration.

Figure 18A:
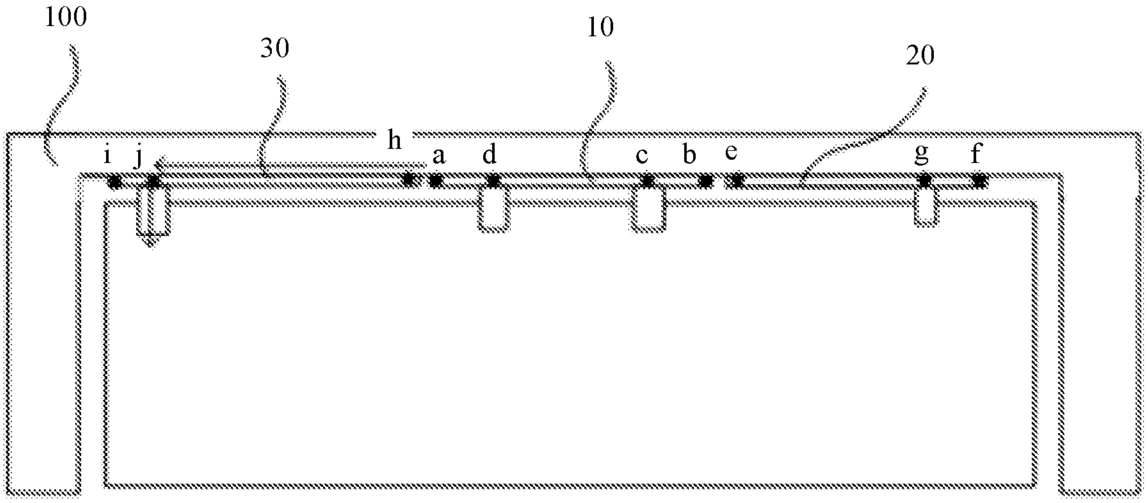
FIG. 18*a* to FIG. 18*c* are schematic diagrams of currents of an antenna according to an embodiment of this application.
Figure 18B:
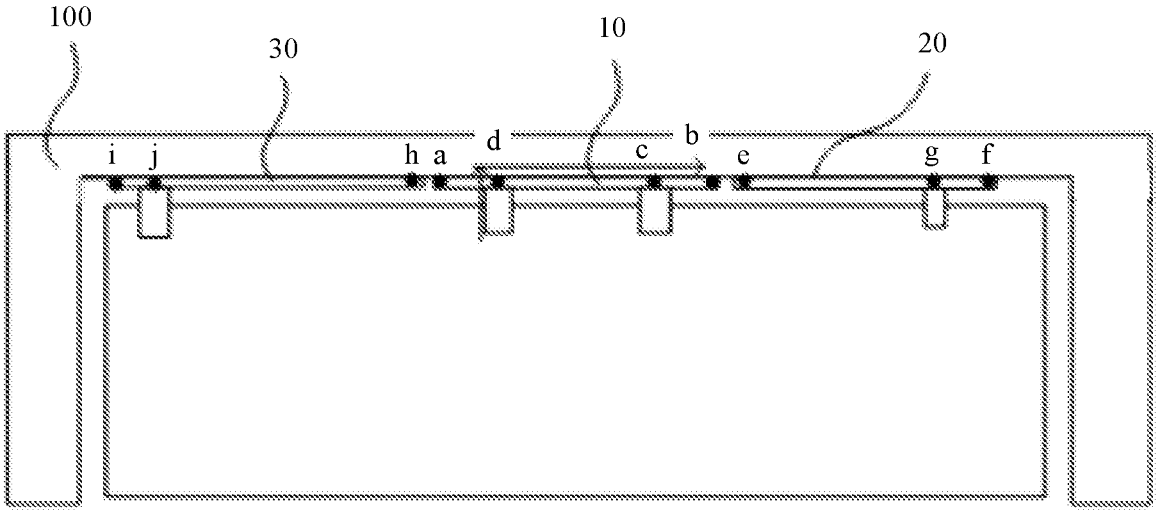
Figure 18C:
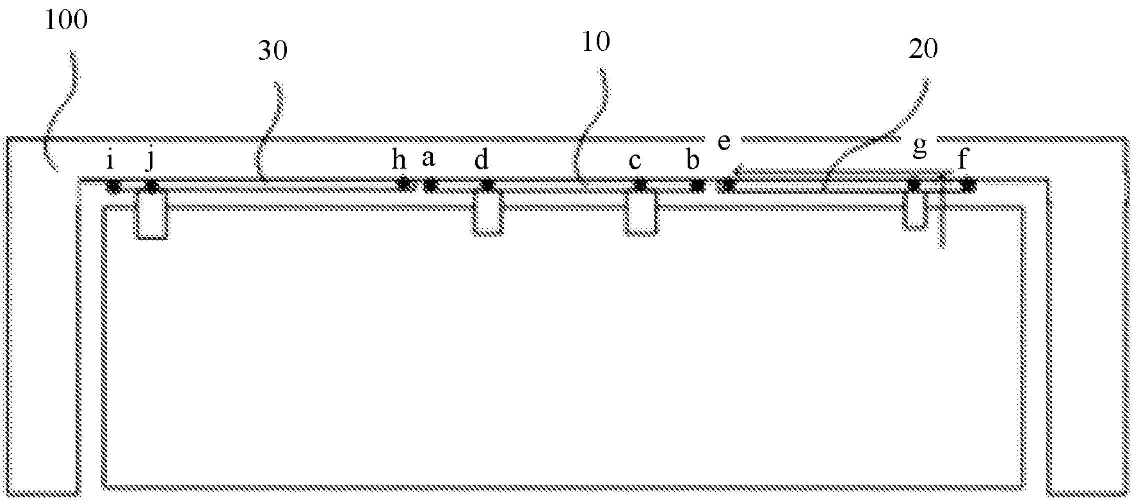

FIG. 18*a* to FIG. 18*c* are schematic diagrams of currents of an antenna according to an embodiment of this application.

First, refer to FIG. 18*a*. A current flows from the fifth end h of the second parasitic stub 30 to the sixth end i. The current excites the ¼ mode of the second parasitic stub 30. A resonance in the ¼ mode excited by the second parasitic stub 30 is at 1.65 GHz.

Refer to FIG. 18*b*. A current flows from the first ground point d of the main stub 10 to the second end b. The current excites the ¼ mode of the main stub 10. A resonance in the ¼ mode excited by the circuit on the main stub 10 is at 1.75 GHz.

Refer to FIG. 18*c*. A current flows from the second ground point g of the first parasitic stub 20 to the third end e. The current excites the ¼ mode of the first parasitic stub 20. A resonance in the ¼ mode excited by the first parasitic stub 20 is at 2.0 GHz.

It can be learned from the foregoing description that the ¼ mode is excited by the main stub 10, the ¼ mode is excited by the first parasitic stub 20, and the ½ mode is excited by the second parasitic stub 30 and placed before the ¼ mode of the main stub 10, so that radiation efficiency of both a front half and a rear half of a main resonance (a resonance excited by the main stub 10) is improved.

Figure 19:
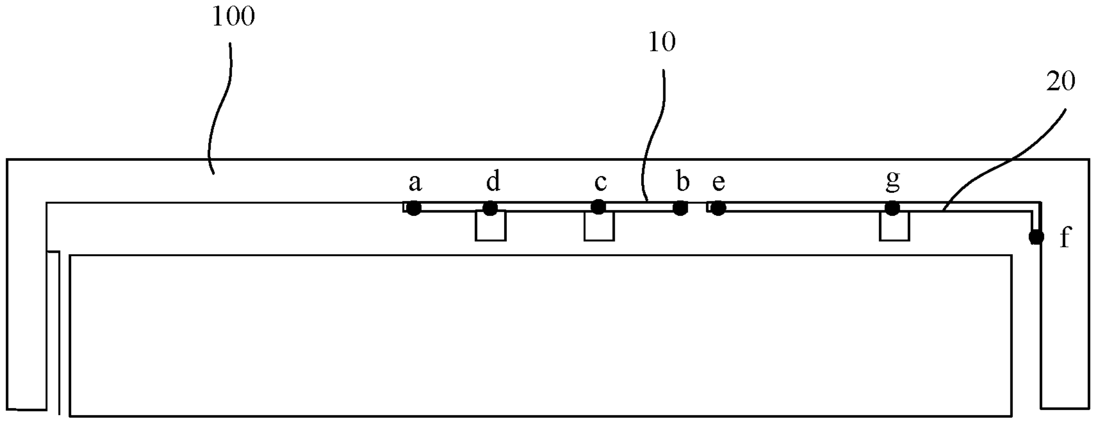
FIG. 19 is a schematic diagram of a structure of another antenna according to an embodiment of this application.

FIG. 19 is a schematic diagram of a structure of another antenna according to an embodiment of this application. The antenna shown in FIG. 19 includes a first parasitic stub 20 and a main stub 10. The main stub 10 is configured as a main radiation structure of the antenna, and the first parasitic stub 20 is coupled to the main stub 10, to expand bandwidth of the antenna.

The main stub 10 is of a long-strip-shaped metal structure, may be a metal frame of the mobile terminal, may be structures such as an embedded metal layer, a laser forming structure, and a flexible circuit board that are in the housing 100 of the mobile terminal, or may be another metal structure in the housing 100. Two ends of the main stub 10 are respectively a first end a and a second end b. A feed point c is disposed at a position that is of the main stub 10 and that is close to the second end b, and the feed point c is configured to connect to a feed line. A first ground point d is disposed at a position that is of the main stub 10 and that is close to the first end a, and the first ground point d is configured to connect to a ground cable. A length (a current path length) of the main stub 10 is not specifically limited in this application, and a specific length of the main stub 10 may be adjusted based on an operating frequency of the antenna.

The first parasitic stub 20 is a parasitic stub configured to excite resonances in two different modes. As shown in FIG. 5, the first parasitic stub 20 is of a long-strip-shaped structure, may be a metal frame of the mobile terminal, may be structures such as an embedded metal layer, a laser forming structure, and a flexible circuit board that are embedded in the housing 100 of the mobile terminal, or may be another metal structure in the housing 100. The first parasitic stub 20 has a third end e and a fourth end f A second ground point g is disposed at a location that is of the first parasitic stub 20 and that is away from the third end e. There is a gap between the third end e of the first parasitic stub 20 and the second end b of the main stub 10. The first parasitic stub 20 is coupled to the main stub 10 via the gap between the second end b and the third end e. Because both the second end b and the third end e are free ends, the first parasitic stub 20 is coupled to the main stub 10 by electric field coupling.

In an optional solution, an end that is of the first parasitic stub 20 and that is away from the main stub 10 has a bending structure, and the bending structure is a bending structure formed along a shape in the housing 100 of the mobile phone. In allowed space in the housing 100 of the mobile phone, the first parasitic stub 20 may be bent along the space in the housing 100 of the mobile phone, to ensure a current path length of the first parasitic stub 20.

In an optional solution, a tunable component or a fixed component may be connected between the second ground point g. For example, the fixed component may be any one of a fixed resistor, a fixed capacitor, a fixed inductor component, a distributed inductor, a distributed capacitor, or a filter circuit, and the tunable component may be a switch or a variable capacitor.

Figure 20:
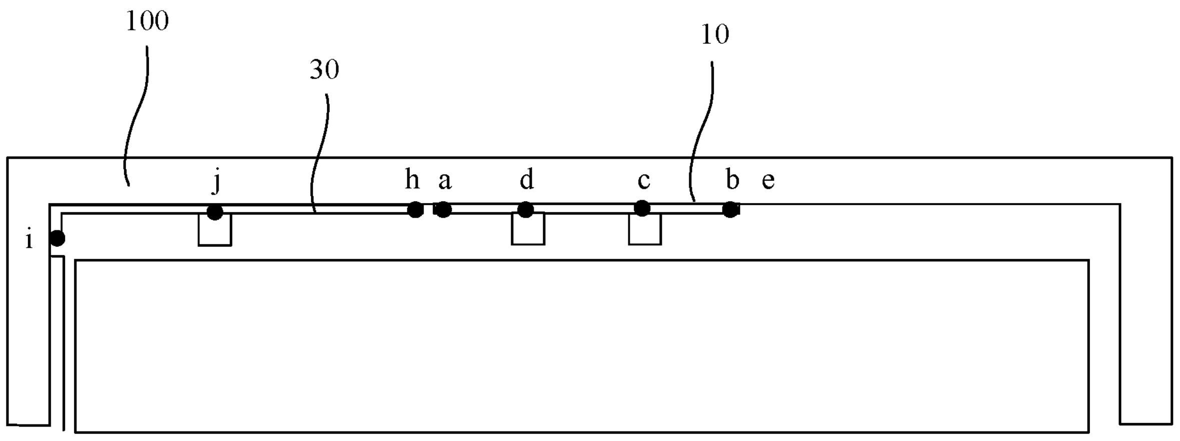
FIG. 20 is a schematic diagram of a structure of another antenna according to an embodiment of this application.

FIG. 20 is a schematic diagram of a structure of another antenna according to an embodiment of this application. The antenna shown in FIG. 19 includes a second parasitic stub 30 and a main stub 10. The main stub 10 is configured as a main radiation structure of the antenna, and the second parasitic stub 30 is coupled to the main stub 10, to expand bandwidth of the antenna.

The main stub 10 is of a long-strip-shaped metal structure, may be a metal frame of the mobile terminal, may be structures such as an embedded metal layer, a laser forming structure, and a flexible circuit board that are in the housing 100 of the mobile terminal, or may be another metal structure in the housing 100. Two ends of the main stub 10 are respectively a first end a and a second end b. A feed point c is disposed at a position that is of the main stub 10 and that is close to the second end b, and the feed point c is configured to connect to a feed line. A first ground point d is disposed at a position that is of the main stub 10 and that is close to the first end a, and the first ground point d is configured to connect to a ground cable. A length (a current path length) of the main stub 10 is not specifically limited in this application, and a specific length of the main stub 10 may be adjusted based on an operating frequency of the antenna.

The second parasitic stub 30 is a parasitic stub configured to excite resonances in two different modes. As shown in FIG. 5, the second parasitic stub 30 is of a long-strip-shaped structure, and the second parasitic stub 30 has a fifth end h and a sixth end i. A third ground point j is disposed at a location that is of the second parasitic stub 30 and that is away from the fifth end h. There is a gap between the fifth end h of the second parasitic stub 30 and the first end a of the main stub 10. The second parasitic stub 30 is coupled to the main stub 10 via the gap between the first end a and the fifth end h. Because the fifth end h is a free end, and the first end a is a ground end, the second parasitic stub 30 is coupled to the main stub 10 by electric field and magnetic field coupling.

In an optional solution, an end that is of the second parasitic stub 30 and that is away from the main stub 10 has a bending structure, and the bending structure is a bending structure formed along a shape in the housing 100 of the mobile phone. In allowed space in the housing 100 of the mobile phone, the second parasitic stub 30 may be bent along the space in the housing 100 of the mobile phone, to ensure a current path length of the second parasitic stub 30.

In an optional solution, a tunable component or a fixed component may be connected between the first ground point d and the third ground point j. For example, the fixed component may be any one of a fixed resistor, a fixed capacitor, a fixed inductor component, a distributed inductor, a distributed capacitor, or a filter circuit, and the tunable component may be a switch or a variable capacitor.

In the antennas shown in FIG. 19 and FIG. 20, although the antenna includes only one parasitic stub (the first parasitic stub 20 or the second parasitic stub 30), the first parasitic stub 20 is a parasitic stub that can be configured to excite resonances in two different modes, and the second parasitic stub 30 is also a parasitic stub that can be configured to excite resonances in two different modes. In the foregoing technical solution, the first parasitic stub 20 and the second parasitic stub 30 are coupled to the main stub 10 in an electric field coupling manner or an electric field and magnetic field coupling manner, to excite a resonance to improve antenna efficiency, expand bandwidth, and improve antenna performance.

An embodiment of this application further provides a mobile terminal. The mobile terminal includes a housing 100 and the antenna according to any one of the foregoing solutions disposed in the housing 100. In the foregoing technical solution, the first parasitic stub 20 and the second parasitic stub 30 are coupled to the main stub 10 in an electric field coupling manner or an electric field and magnetic field coupling manner, to excite a resonance to improve antenna efficiency, expand bandwidth, and improve antenna performance.

In a specific implementable solution, the first parasitic stub 20, the main stub 10, and the second parasitic stub 30 may be disposed at any position of the housing 100, including but not limited to upper and lower short edges, left and right long edges, four corners combining the long and short edges of the housing 100, and the like. This facilitates antenna configuration. The upper and lower short edges may be edges that are respectively close to an earpiece of a mobile phone and a microphone of the mobile phone. The left and right long edges are another two edges adjacent to the upper and lower short edges. In the figure illustrated in this embodiment of this application, although only an example in which the antenna is disposed on the upper short edge of the housing 100 is shown, the foregoing figure is merely an example of an antenna structure. The antenna provided in this embodiment of this application may alternatively be disposed on the lower short edge, the left and right long edges, or the corners of the long and short edges of the housing 100.

In a specific implementable solution, an implementation of the antenna includes but is not limited to making the main stub 10, the first parasitic stub 20, and the second parasitic stub 30 from a metal frame, an embedded metal, a laser forming structure, a flexible circuit board, or another metal material in the housing 100. The foregoing material is a relatively common material used as a radiator of an antenna in a mobile phone. Details are not described herein again.

It is clearly that a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. An antenna comprising:

a main stub, a first parasitic stub, and a second parasitic stub, wherein the main stub comprises a first end and a second end, a feed point is disposed between the first end and the second end, a first ground point is disposed on the main stub, and the first ground point is closer to the first end than the second end;

the first parasitic stub and the second parasitic stub are respectively arranged on two sides of the main stub;

the first parasitic stub comprises a third end and a fourth end, the second parasitic stub comprises a fifth end and a sixth end, the first parasitic stub is coupled to the main stub via a first gap between the second end and the third end, the second parasitic stub is coupled to the main stub via a second gap between the first end and the fifth end;

a second ground point is disposed on the first parasitic stub, and is at a location that is between the third end and the fourth end;

a third ground point is disposed on the second parasitic stub, and is at a location that is closer to the fifth end than the sixth end;

a fourth ground point is disposed on a side that is of the second parasitic stub and that is closer to the sixth end than the fifth end;

a fifth ground point is disposed on a side that is of the first parasitic stub and that is closer to the fourth end than the third end; and wherein a second resonating frequency of the first parasitic stub is greater than a first resonating frequency of the main stub; and a third resonating frequency of the second parasitic stub is less than the first resonating frequency of the resonance excited by the main stub.

2. The antenna according to claim 1, wherein the first parasitic stub is a parasitic stub configured to excite resonances in two different resonances; and the second parasitic stub is a parasitic stub configured to excite resonances in two different resonances.

3. The antenna according to claim 2, wherein the resonances in the two different resonances for each of the first parasitic stub and the second parasitic stub comprise any two of: a resonance with a wavelength of ¼λ, a resonance with a wavelength of ½λ, a resonance with a wavelength of ¾λ, or a resonance with a wavelength of λ, wherein λ is a wavelength corresponding to an operating frequency of the antenna.

4. The antenna according to claim 1, wherein the second ground point is connected to a high-pass low-cut filter circuit.

5. The antenna according to claim 1, wherein the second ground point, the third ground point, or the fourth ground point is separately connected to a tunable component or a fixed component.

6. The antenna according to claim 5, wherein the fixed component is any one of: a fixed resistor component, a fixed capacitor component, a fixed inductor component, a distributed inductor, a distributed capacitor, and a filter circuit; and the tunable component is one of a switch or a variable capacitor.

7. The antenna according to claim 1, wherein the first parasitic stub is configured to excite a resonance which is the same as a resonance exited by the second parasitic stub.

8. The antenna according to claim 7, wherein the same resonance exited by the first parasitic stub and the second parasitic stub is any one of: a resonance with a wavelength of ¼λ, a resonance with a wavelength of ½λ, a resonance with a wavelength of ¾λ, or a resonance with a wavelength of λ, wherein λ is a wavelength corresponding to an operating frequency of the antenna.

9. A mobile terminal comprising:

a housing and an antenna disposed in the housing, wherein the housing comprises a metal frame, the antenna comprises a main stub, a first parasitic stub, and a second parasitic stub, wherein each of the main stub, the first parasitic stub, and the second parasitic stub is a part of the metal frame, wherein the main stub comprises a first end and a second end, a feed point is disposed between the first end and the second end, a first ground point is disposed on the main stub, and the first ground point is closer to the first end than the second end;

the first parasitic stub and the second parasitic stub are respectively arranged on two sides of the main stub;

the first parasitic stub comprises a third end and a fourth end, the second parasitic stub comprises a fifth end and a sixth end, the first parasitic stub is coupled to the main stub via a first gap between the second end and the third end, the second parasitic stub is coupled to the main stub via second gap between the first end and the fifth end;

a second ground point is disposed on the first parasitic stub, and is at a location that is between the third end and the fourth end;

a third ground point is disposed on the second parasitic stub, and is at a location that is closer to the fifth end than the sixth end;

a fourth ground point is disposed on a side that is of the second parasitic stub and that is closer to the sixth end than the fifth end;

a fifth ground point is disposed on a side that is of the first parasitic stub and that is closer to the fourth end than the third end; and wherein a second resonating frequency of the first parasitic stub is greater than a first resonating frequency of the main stub; and a third resonating frequency of the second parasitic stub is less than the first resonating frequency of the resonance excited by the main stub.

10. The antenna according to claim 9, wherein the second ground point, the third ground point, or the fourth ground point is separately connected to a tunable component or a fixed component.

11. The antenna according to claim 9, wherein the first parasitic stub is configured to excite a resonance which is the same as a resonance exited by the second parasitic stub.

12. The antenna according to claim 11, wherein the same resonance exited by the first parasitic stub and the second parasitic stub is any one of: a resonance with a wavelength of ¼λ, a resonance with a wavelength of ½λ, a resonance with a wavelength of ¾λ, or a resonance with a wavelength of λ, wherein λ is a wavelength corresponding to an operating frequency of the antenna.

13. The antenna according to claim 9, wherein the second ground point is connected to a high-pass low-cut filter circuit.

14. The antenna according to claim 10, wherein the fixed component is any one of: a fixed resistor component, a fixed capacitor component, a fixed inductor component, a distributed inductor, a distributed capacitor, and a filter circuit; and the tunable component is one of a switch or a variable capacitor.

* * * * *